United States Patent
Seo et al.

(10) Patent No.: US 10,241,718 B2
(45) Date of Patent: Mar. 26, 2019

(54) ELECTRONIC DEVICE AND METHOD OF ANALYZING FRAGMENTATION OF ELECTRONIC DEVICE

(71) Applicant: Samsung Electronics Co., Ltd., Gyeonggi-do (KR)

(72) Inventors: Sungjong Seo, Gyeonggi-do (KR); Jongmin Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 121 days.

(21) Appl. No.: 15/126,208

(22) PCT Filed: May 26, 2015

(86) PCT No.: PCT/KR2015/005233
§ 371 (c)(1),
(2) Date: Sep. 14, 2016

(87) PCT Pub. No.: WO2015/182947
PCT Pub. Date: Dec. 3, 2015

(65) Prior Publication Data
US 2017/0083261 A1    Mar. 23, 2017

(30) Foreign Application Priority Data
May 26, 2014 (KR) .......... 10-2014-0062903

(51) Int. Cl.
*G06F 12/00* (2006.01)
*G06F 3/06* (2006.01)
*G06F 12/02* (2006.01)
*G06F 17/00* (2019.01)

(52) U.S. Cl.
CPC .......... *G06F 3/0653* (2013.01); *G06F 3/0605* (2013.01); *G06F 3/0608* (2013.01); *G06F 3/0631* (2013.01); *G06F 3/0644* (2013.01); *G06F 3/0679* (2013.01); *G06F 12/02* (2013.01); *G06F 17/00* (2013.01)

(58) Field of Classification Search
CPC .... G06F 3/0653; G06F 3/0605; G06F 3/0608; G06F 3/0631
See application file for complete search history.

(56) References Cited

U.S. PATENT DOCUMENTS

| | | | |
|---|---|---|---|
| 8,051,265 B2 * | 11/2011 | Lee ............. | G06F 12/023 711/165 |
| 2007/0226445 A1 | 9/2007 | Nichols et al. | |
| 2009/0150633 A1 | 6/2009 | Lee et al. | |
| 2010/0146195 A1 * | 6/2010 | Lee ............. | G06F 3/0616 711/103 |

(Continued)

FOREIGN PATENT DOCUMENTS

WO    WO 2012/177576    12/2012

OTHER PUBLICATIONS

PCT/ISA/210 Search Report issued on PCT/KR2015/005233 (pp. 3).
PCT/ISA/237 Written Opinion issued on PCT/KR2015/005233 (pp. 6).

*Primary Examiner* — Gurtej Bansal
(74) *Attorney, Agent, or Firm* — The Farrell Law Firm, P.C.

(57) ABSTRACT

Disclosed is a method of analyzing fragmentation of an electronic device, which comprises: receiving information on at least one allocation unit of a memory; and calculating fragmentation ratio information on the basis of the received information on at least one allocation unit.

14 Claims, 18 Drawing Sheets

(56) References Cited

U.S. PATENT DOCUMENTS

2011/0099326 A1    4/2011   Jung et al.
2012/0005405 A1    1/2012   Wu et al.
2012/0324198 A1   12/2012   Spradlin et al.
2013/0103841 A1    4/2013   Werth et al.

* cited by examiner

[Fig. 1]
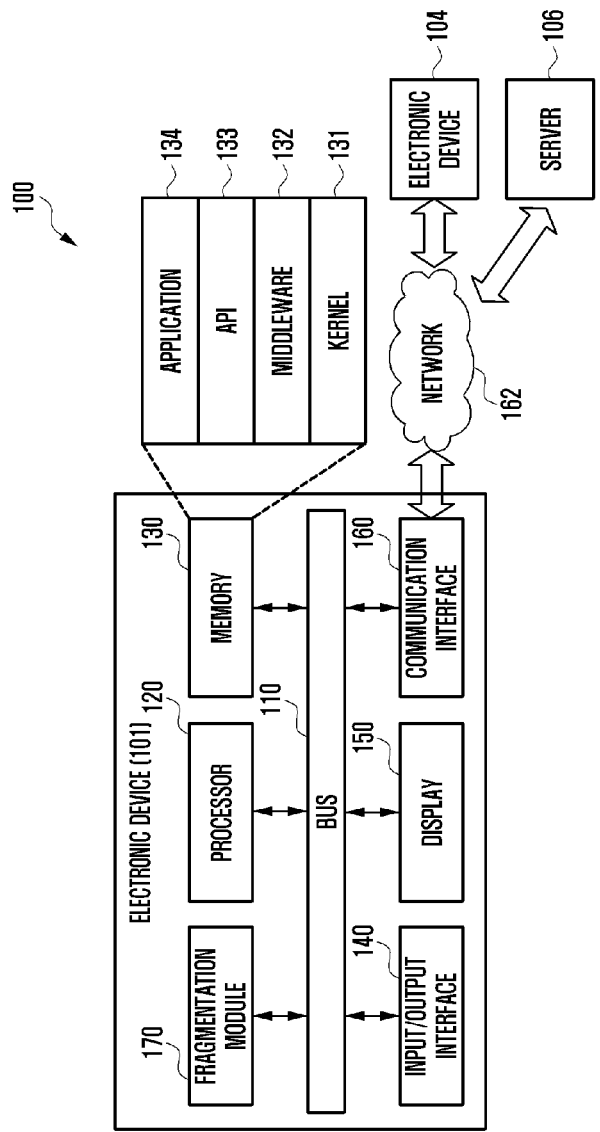

[Fig. 2a]
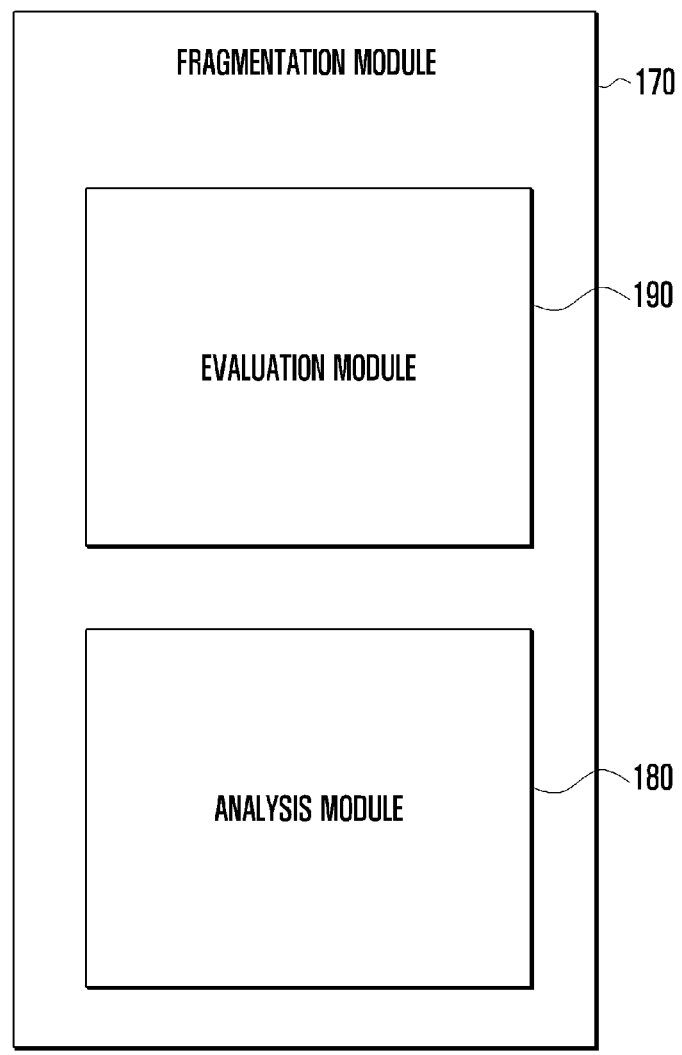

[Fig. 2b]
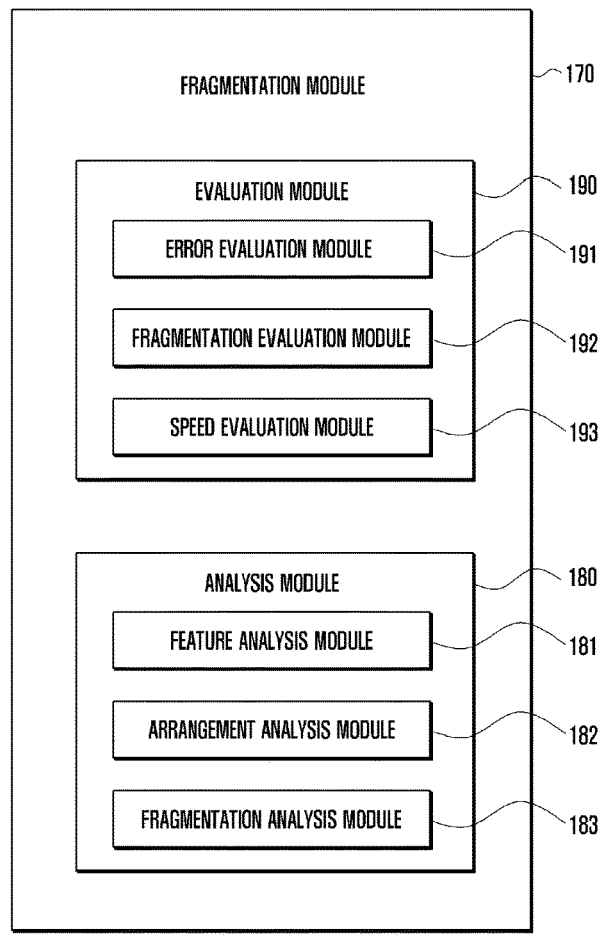
[Fig. 3a]
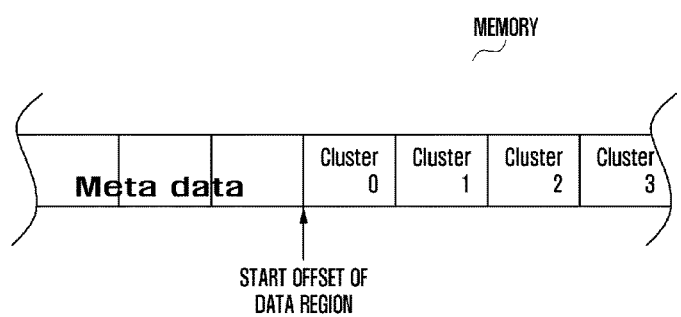
[Fig. 3b]
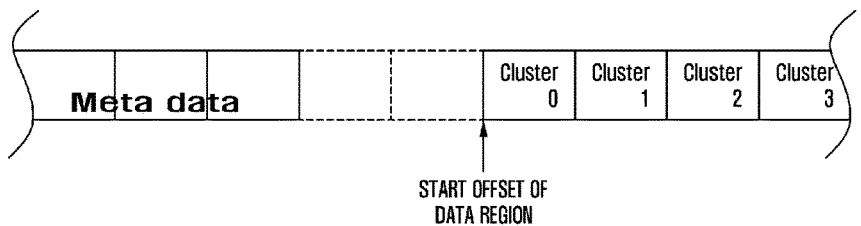

[Fig. 3c]
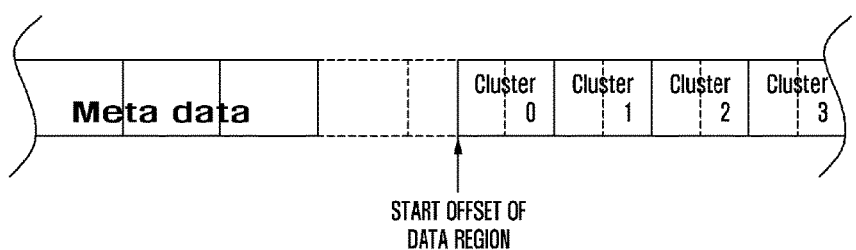
START OFFSET OF
DATA REGION
[Fig. 4]
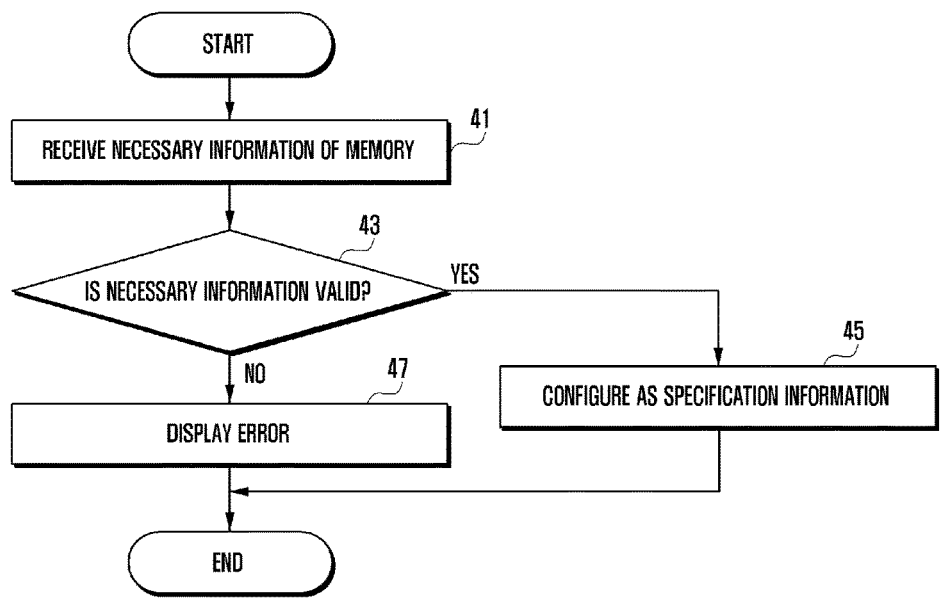

[Fig. 5]
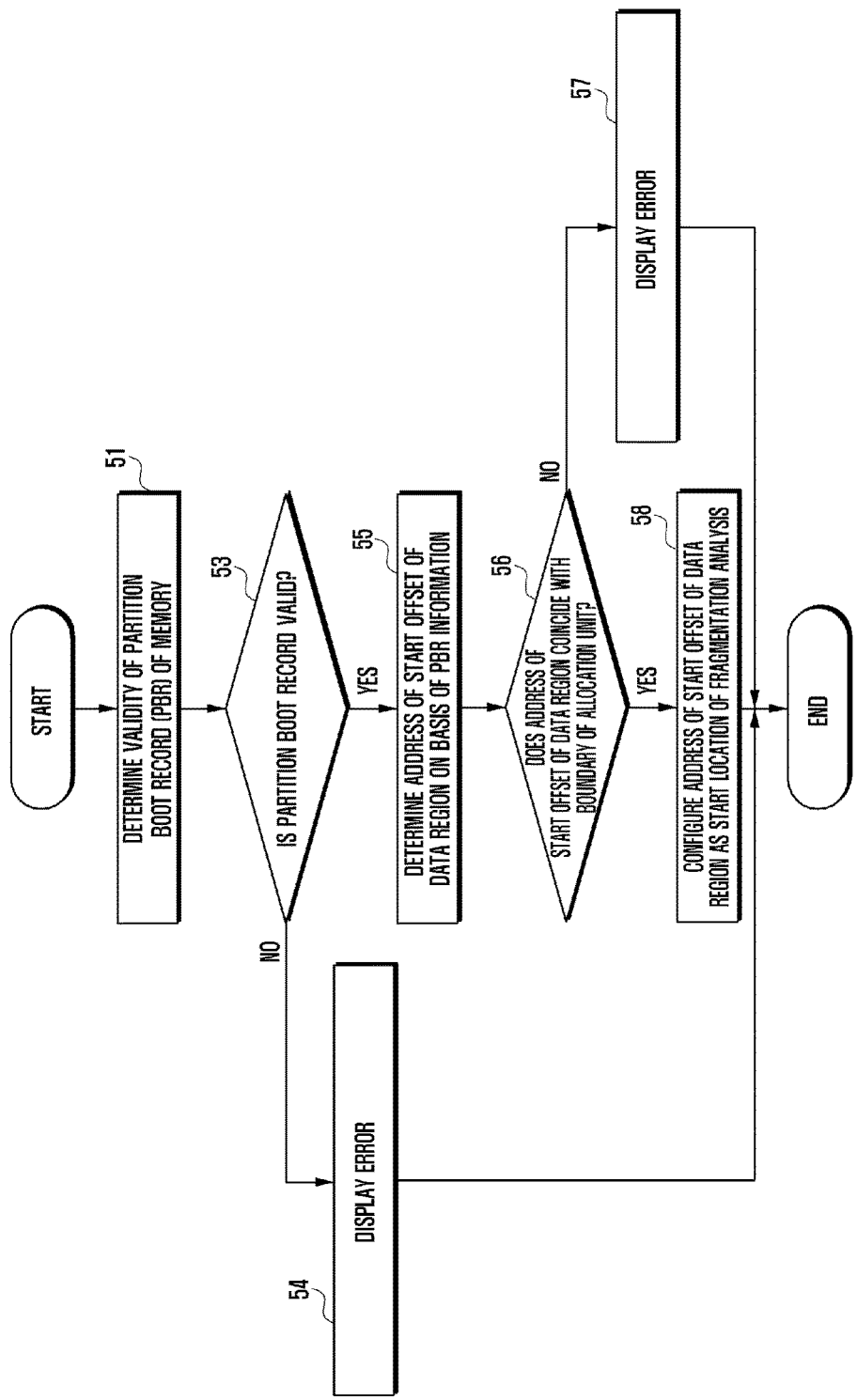

[Fig. 6]
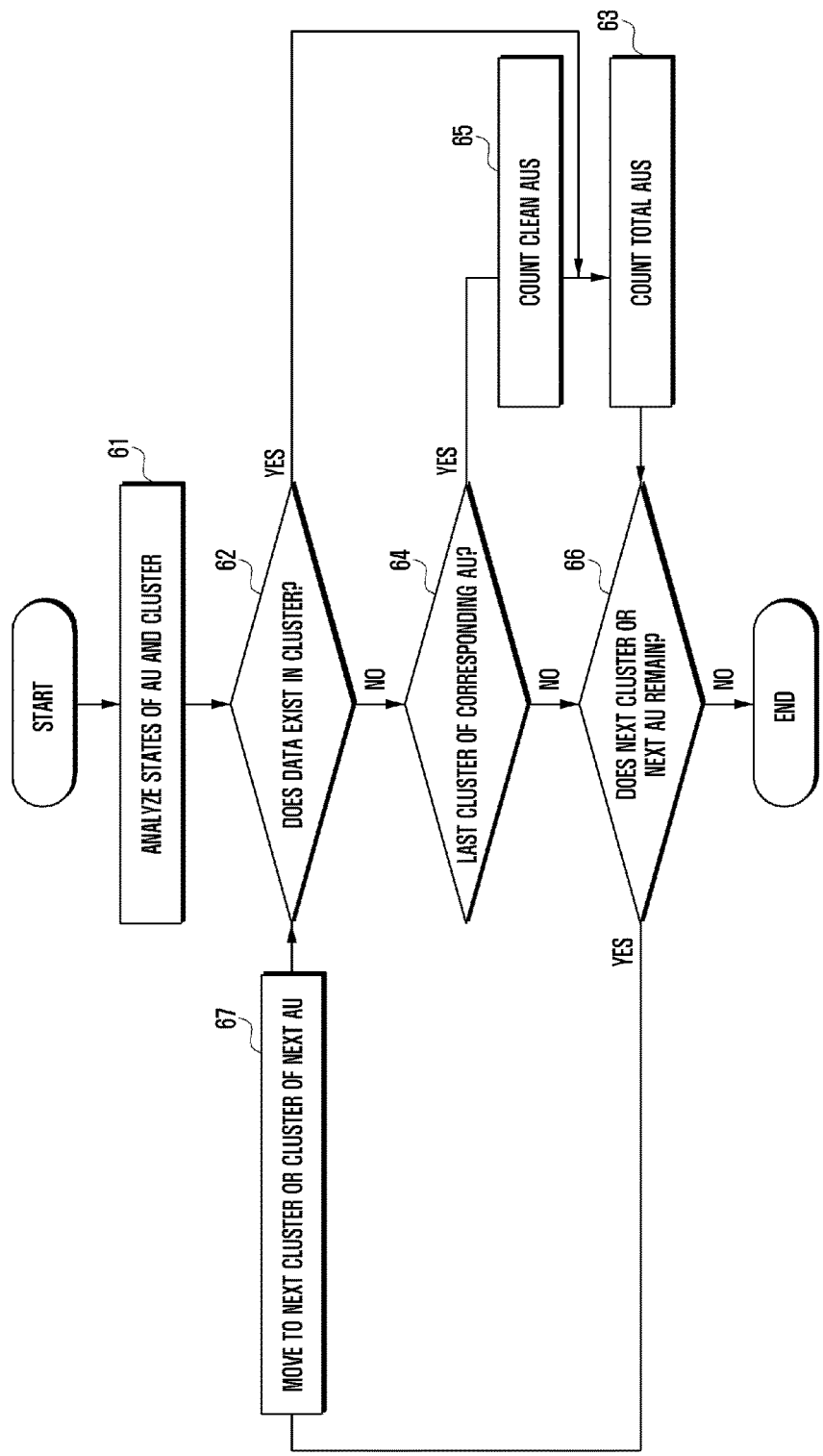

[Fig. 7]
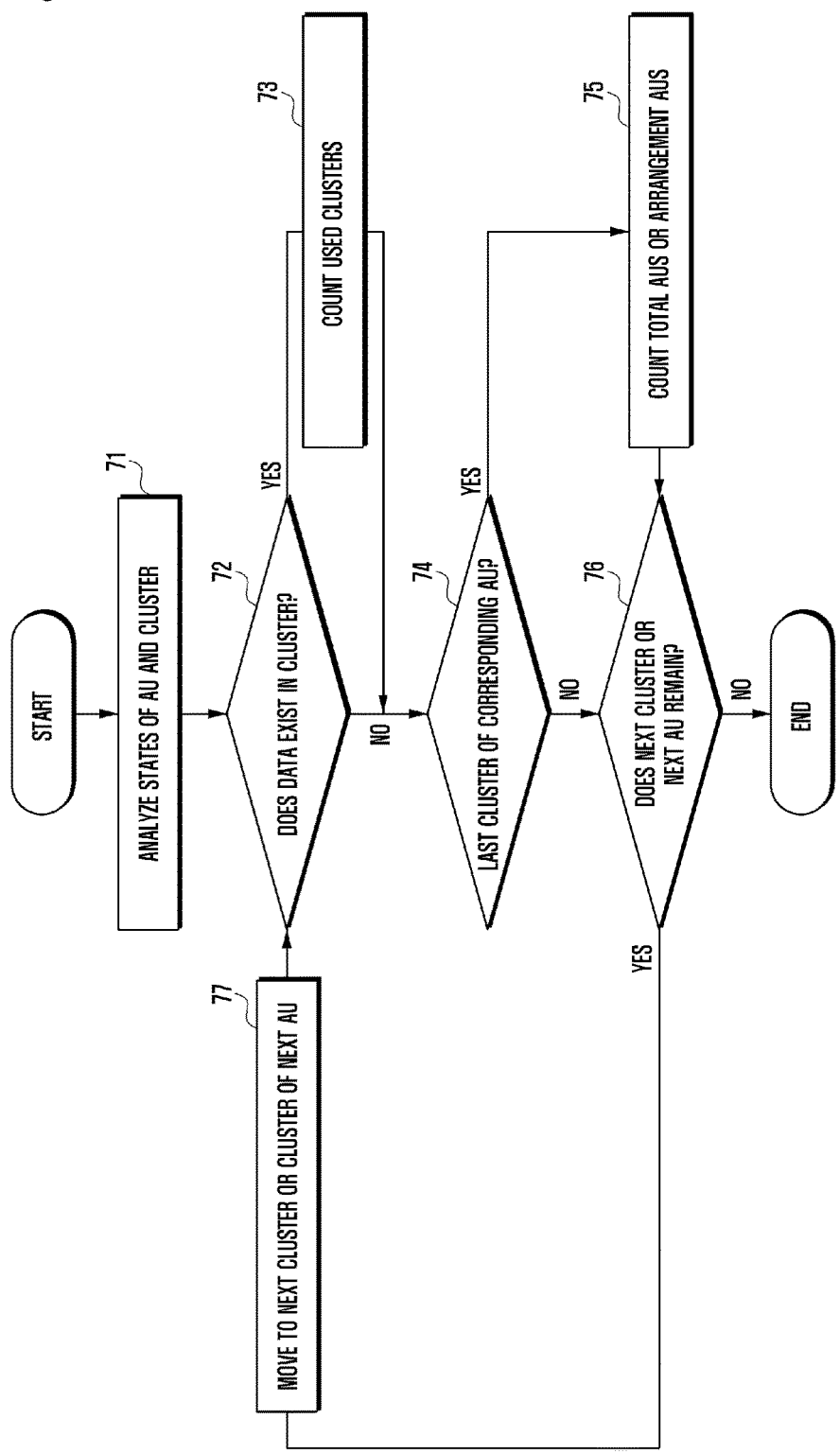

[Fig. 8]
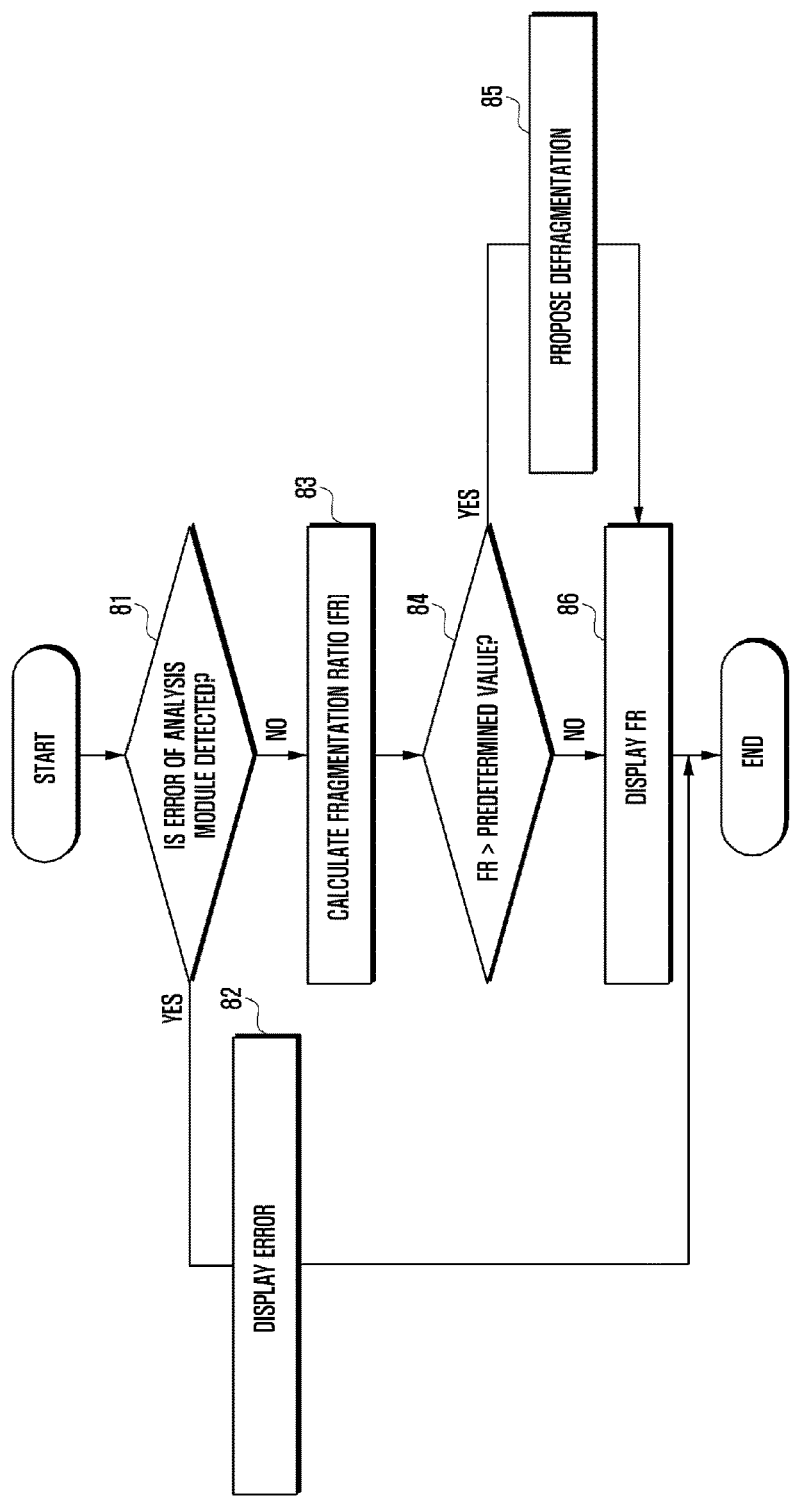

[Fig. 9]
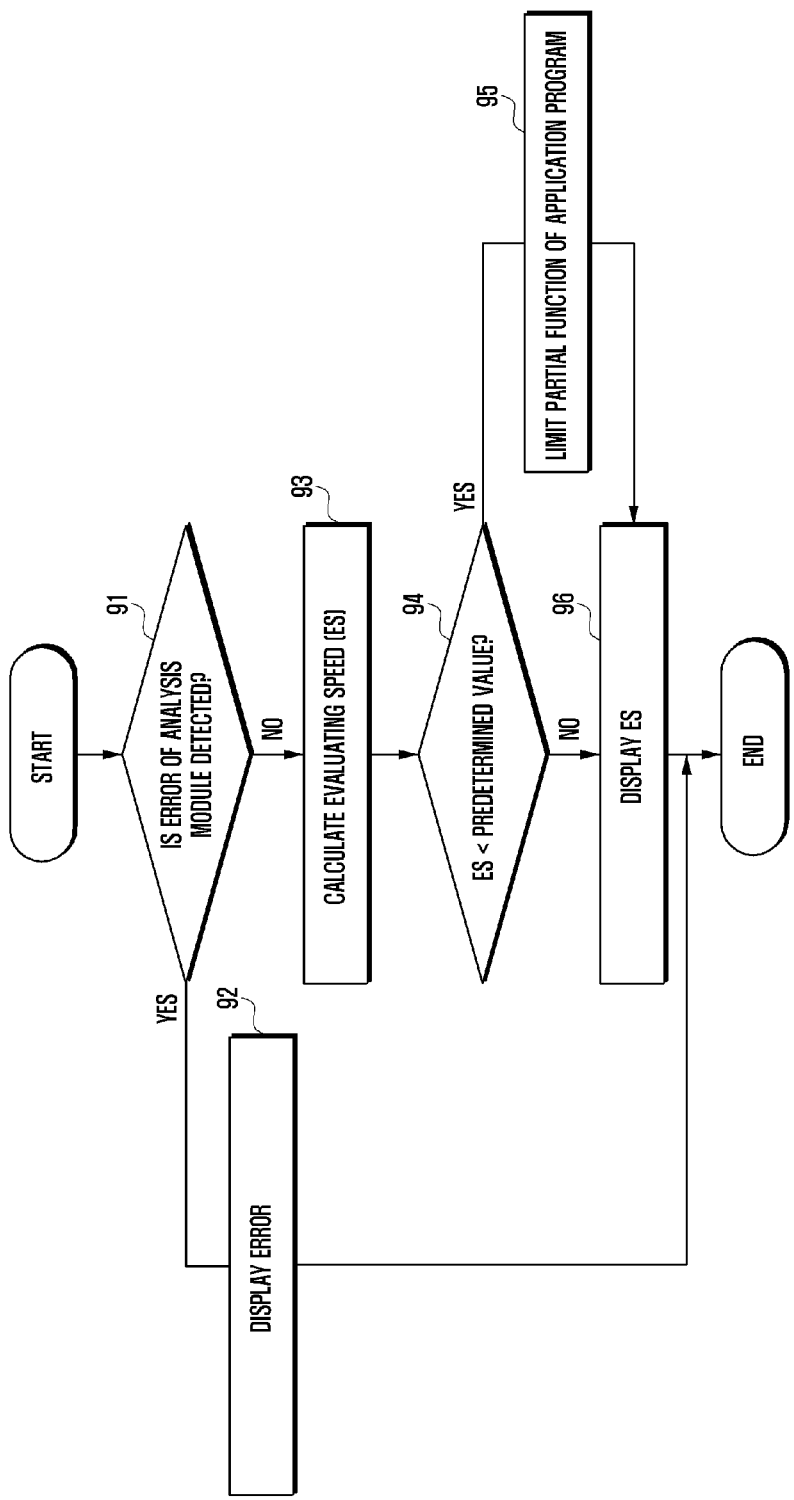

[Fig. 10]
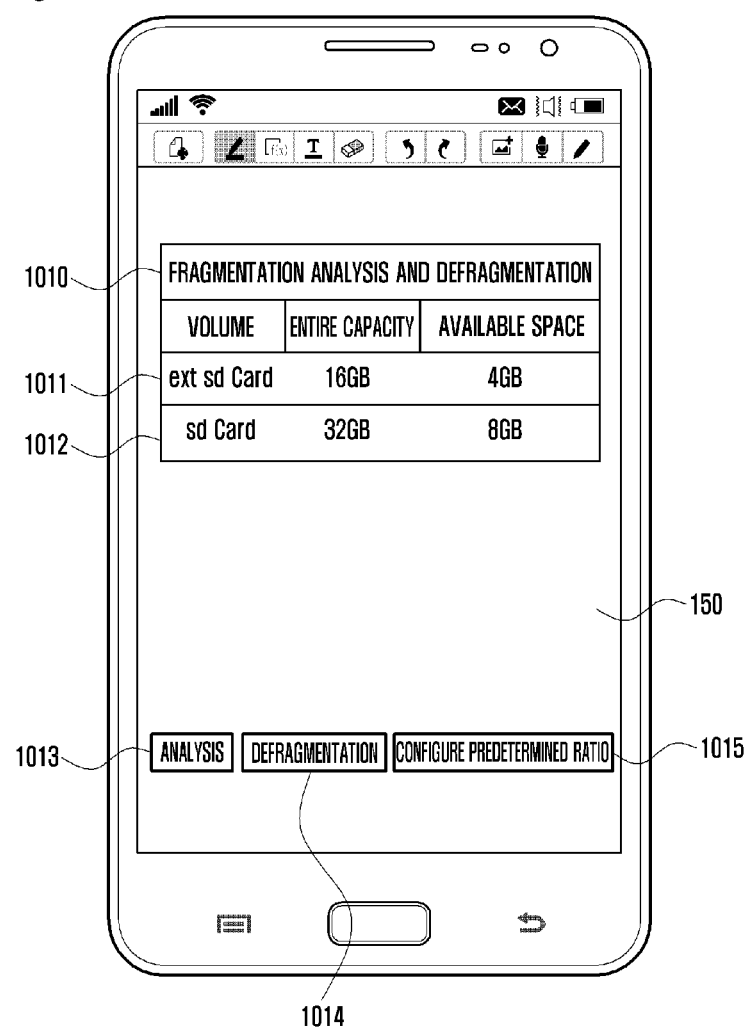

[Fig. 11a]
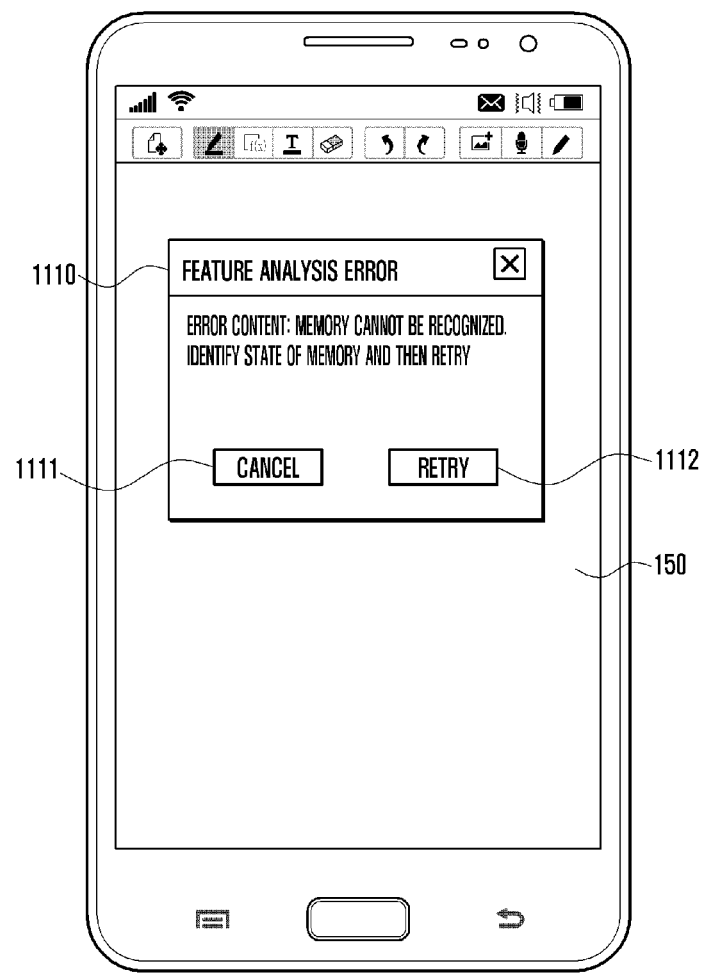

[Fig. 11b]
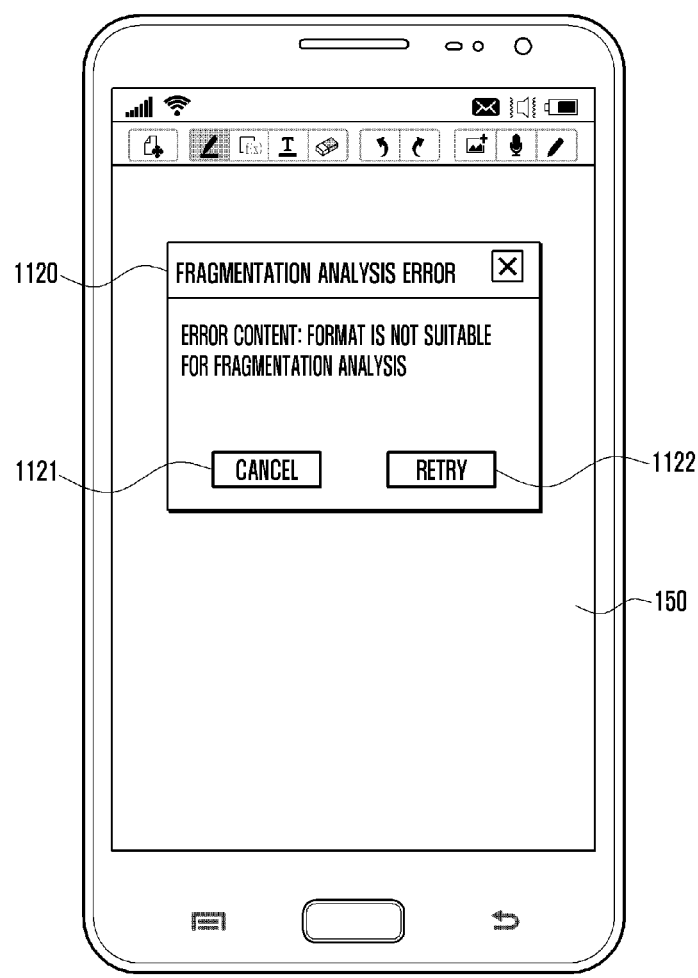

[Fig. 11c]
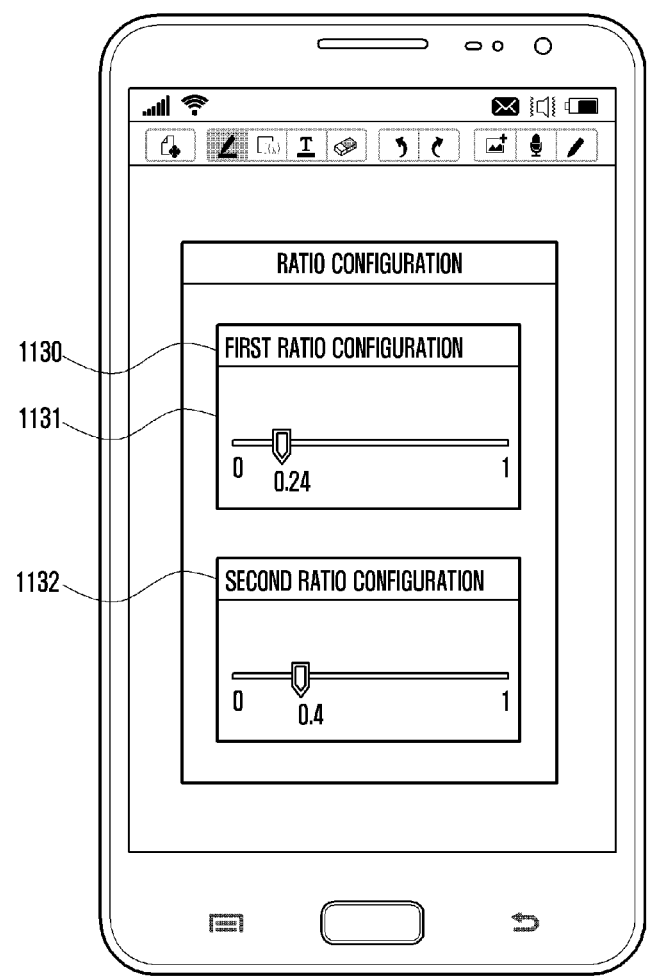

[Fig. 11d]
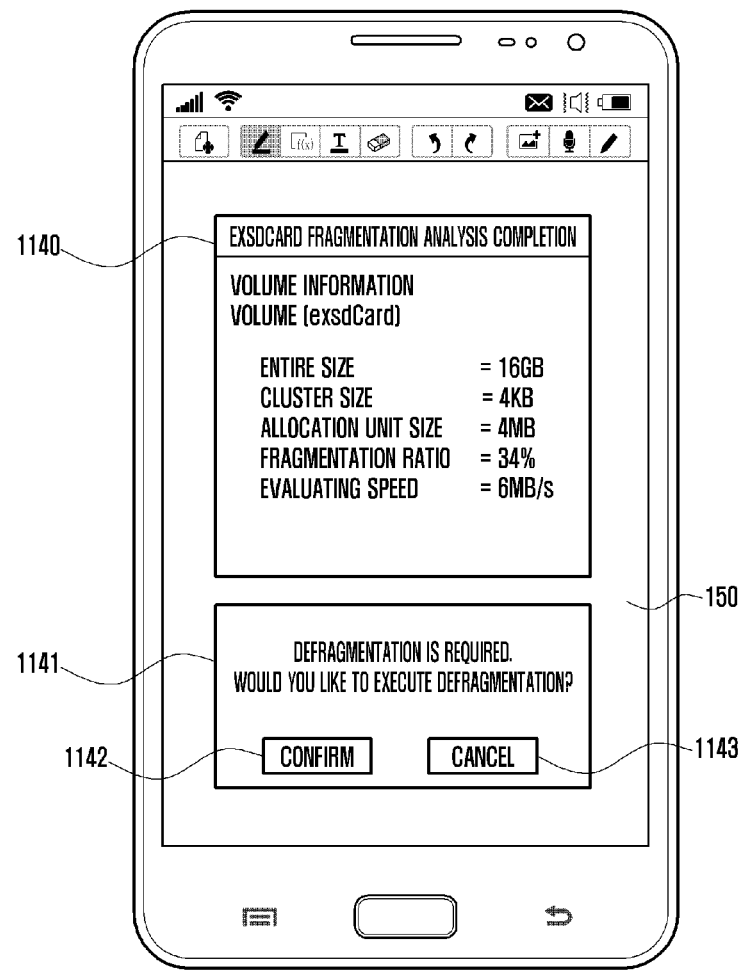

[Fig. 11e]
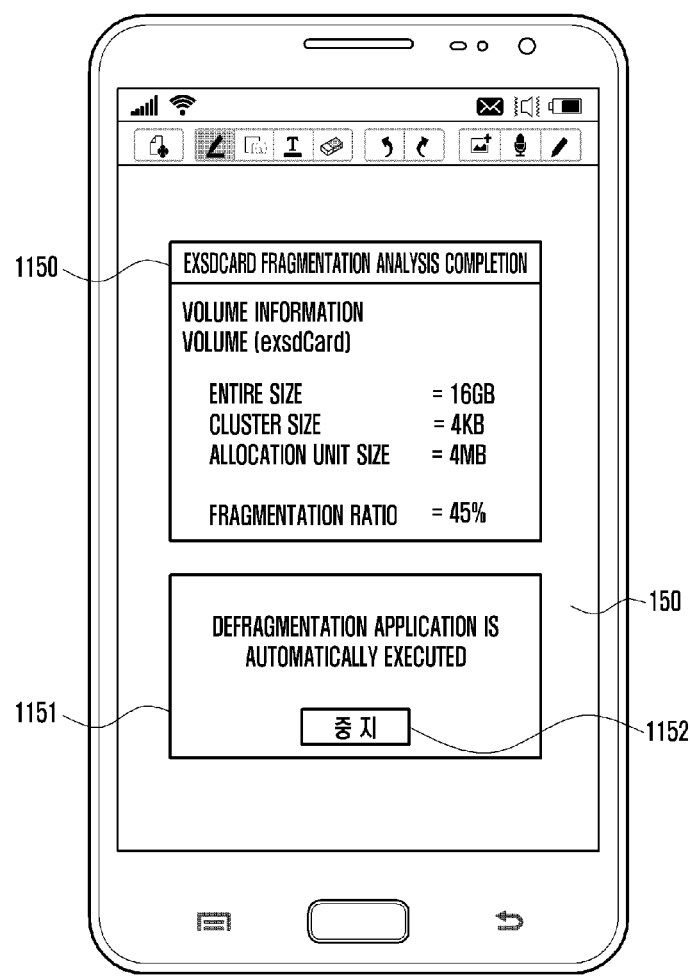

[Fig. 12]
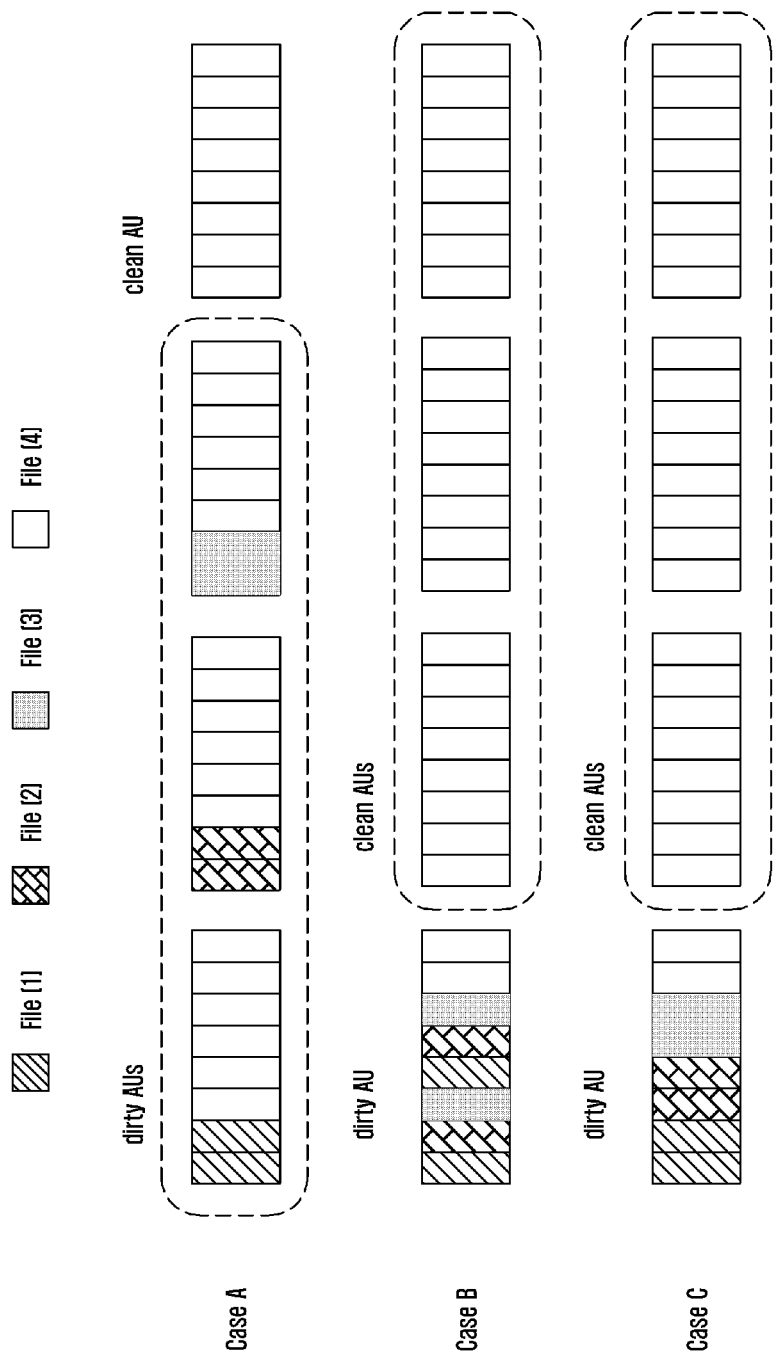

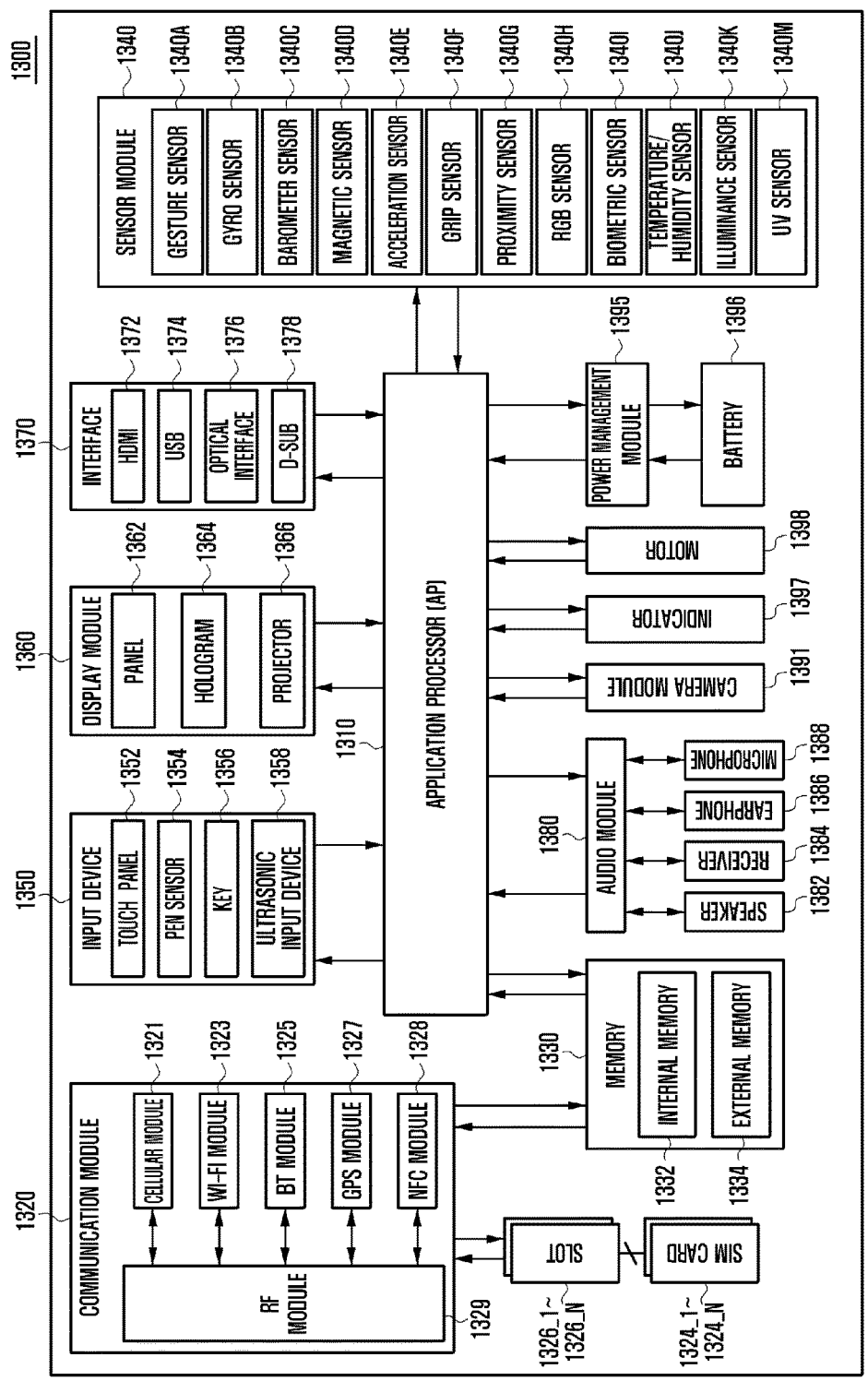
[Fig. 13]

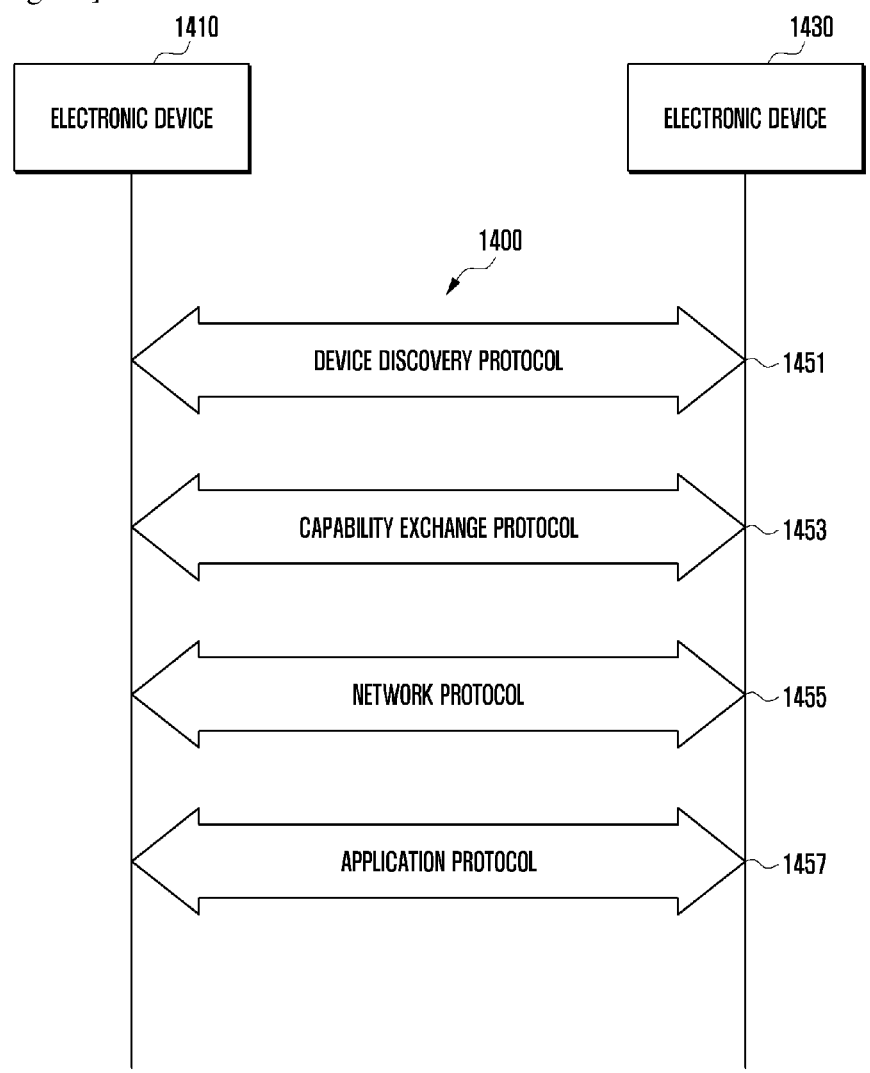
[Fig. 14]

ELECTRONIC DEVICE AND METHOD OF ANALYZING FRAGMENTATION OF ELECTRONIC DEVICE

PRIORITY

This application is a National Phase Entry of PCT International Application No. PCT/KR2015/005233 which was filed on May 26, 2015, and claims priority to Korean Patent Application No. 10-2014-0062903, which was filed on May 26, 2014, the contents of each of which are incorporated herein by reference.

FIELD

Various embodiments of the present specification relate to a method of analyzing fragmentation of data of an electronic device and an electronic device implementing the same.

ART

In general, fragmentation is a phenomenon in which an empty space or data of a storage device is divided into a plurality of fragments. The phenomenon may cause a problem that an available space of the storage device is reduced or speeds at which reading and writing are performed become slower. Fragmentation analysis (defragmentation) is an operation of gathering the fragmented empty space or the fragmented data.

In general, a standard of file system fragmentation is determined on the basis of file fragmentation, free space fragmentation, and file scattering. The file fragmentation implies that a data block of each file is not continuously allocated. The free space fragmentation implies that an empty space of a data region is discontinuous. The file scattering implies that associated files are recorded while not being gathered but being scattered. In particular, among them, the file fragmentation makes a reading performance largely decreased, and thus, makes a system performance not ensured. Therefore, the file fragmentation is considered to be a main criterion used for analyzing a file system fragmentation state. These criteria are based on physical characteristics of a Hard Disk Drive (HDD) which is a representative storage device widely used until now. A time (seek time) consumed for searching for a data bock of an HDD largely influences reading/writing performances. A representative file system fragmentation analysis tool, which is generally used, is exemplified as a "disk defragmenter" of MS Windows.

In recent years, a flash memory type Security Digital (SD) card is widely used instead of a magnetic disk type HDD. Since a storage device such as an SD card, to which an NAND flash is applied, is configured by a set of logical units called Allocation Units (AUs), a form in which data is stored is physically different from the existing HDD. Such a flash memory type storage device has a speed class. The speed class implies that a minimum speed is ensured at which data can be sequentially or irregularly written in an AU. The flash memory type SD card having a speed class has characteristics that there is no block search time and a reading performance thereof is rapider than a writing performance thereof. In other words, the speed class of the SD card, etc. is determined on the basis of whether the writing performance is satisfied or not. Since data can be preferentially recorded in an empty AU of the SD card, etc., the writing performance of the SD card may be changed according to the number of empty AUs.

An object of file system fragmentation analysis is to determine whether a block is allocated in accordance with characteristics of a storage device. A conventional file system analysis method of a HDD, etc., determines discontinuous data blocks for all files, starting from a root directory. Previous file system fragmentation analysis tools analyze a continuity of a data block for a file in the same form. However, since an SD card, which is recently used as a main storage place of a mobile device, etc., has physical characteristics different from those of the existing HDD, a new fragmentation analysis criterion different from that of the conventional fragmentation analysis is required.

Since a flash memory type storage device has physical characteristics different from those of the existing HDD, the conventional fragmentation analysis tool may not be suitable for fragmentation analysis for the flash memory type storage device.

Further, in a case of a flash memory type storage device having a speed class, the conventional fragmentation analysis tool may not be suitable for predicting a speed class according to a degree of fragmentation.

Thus, proposed are a method of analyzing a file system fragmentation ratio of a current storage device on the basis of not the existing file system fragmentation analysis but a state of an allocation unit and a method of predicting an evaluating speed of a storage device on the basis of the analyzed information.

Various embodiments of the present specification propose an electronic device which can improve the aforementioned problem and a fragmentation analysis method of the electronic device.

SUMMARY

A method of analyzing fragmentation of an electronic device according to various embodiments of the present specification comprises: receiving information on at least one allocation unit of a memory; and calculating fragmentation ratio information of the memory on the basis of the received information on at least one allocation unit.

A method of analyzing fragmentation of an electronic device according to various embodiments of the present specification comprises: receiving information on at least one allocation unit of a memory and a partition boot record information; receiving a start offset of a data region of the memory on the basis of the received partition boot record information; determining whether the received start offset of the data region of the memory coincides with a boundary of the received at least one allocation unit; and when the start offset coincides with the boundary of the at least one allocation unit, calculating fragmentation ratio information on the basis of the received at least one allocation unit with respect to the start offset of the data region of the memory.

An electronic device according to various embodiments of the present specification comprises: an analysis module that receives information on at least one allocation unit of a memory, and analyzes fragmentation information of the memory on the basis of the received information on the at least one allocation unit; and an evaluation module that calculates fragmentation ratio information of the memory on the basis of the analyzed fragmentation information.

An electronic device according to various embodiments of the present specification comprises: an analysis module that receives information on at least one allocation unit of a memory and partition boot record information, receives a start offset of a data region of the memory on the basis of the received partition boot record information, determines whether the received start offset of the data region of the memory coincides with a boundary of the received at least one allocation unit, and when the start offset coincides with the boundary, receives fragmentation module of the memory on the basis of the received information on at least one allocation unit; and an evaluation module that calculates fragmentation ratio information of the memory on the basis of the received fragmentation information.

Advantageous Effects of Invention

In accordance with a fragmentation analysis method of an electronic device according to an embodiment of the present specification, an electronic device can analyze fragmentation information of a flash type storage device on the basis of a state of an allocation unit.

In accordance with a fragmentation analysis method of an electronic device according to an embodiment of the present specification, an evaluating speed according to fragmentation information of a storage device having a flash memory and a speed class can be effectively analyzed.

Further, in accordance with a fragmentation analysis method of an electronic device according to an embodiment of the present specification, a function of an application program can be limited on the basis of fragmentation information and an evaluating speed of an electronic device.

BRIEF DESCRIPTION OF DRAWINGS

FIG. 1 illustrates a network environment including an electronic device according to an embodiment of the present specification;

FIG. 2A is a block diagram illustrating a fragmentation module according to an embodiment of the present specification;

FIG. 2B is a block diagram illustrating a fragmentation module in detail according to an embodiment of the present specification;

FIGS. 3A to 3C are exemplary views for describing an operation of an arrangement analysis unit according to an embodiment of the present specification;

FIG. 4 is a flowchart illustrating a feature analysis method of an electronic device according to an embodiment of the present specification;

FIG. 5 is a flowchart illustrating an arrangement analysis method of an electronic device according to an embodiment of the present specification;

FIG. 6 is a flowchart illustrating a fragmentation analysis method of an electronic device according to an embodiment of the present specification;

FIG. 7 is a flowchart illustrating yet another fragmentation analysis method of an electronic device according to an embodiment of the present specification;

FIG. 8 is a flowchart illustrating a fragmentation ratio evaluation method of an electronic device according to an embodiment of the present specification;

FIG. 9 is a flowchart illustrating a method of calculating an evaluating speed of an electronic device according to an embodiment of the present specification;

FIG. 10 is an exemplary view illustrating a fragmentation analysis method according to an embodiment of the present specification;

FIGS. 11A to 11E are exemplary views illustrating a fragmentation analysis method according to an embodiment of the present specification;

FIG. 12 is an exemplary view illustrating an example of fragmentation according to an embodiment of the present specification;

FIG. 13 is a block diagram illustrating an electronic device according to an embodiment of the present specification; and FIG. 14 illustrates a network environment including an electronic device according to an embodiment of the present specification.

DETAILED DESCRIPTION

Hereinafter, exemplary embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the invention and is not intended to limit the invention to the specific embodiments illustrated. The same reference numbers are used throughout the drawings to refer to the same or like parts.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

FIG. 1 illustrates a network environment 100 including an electronic device 101 according to various embodiments. Referring to FIG. 1, the electronic device 101 may include a bus 110, a processor 120, a memory 130, an input/output interface 140, a display 150, a communication interface 160, and a fragmentation module 170. According to an embodiment, the fragmentation module 170 may is operated by the processor 120 while being included in an operating system, an application program, or the like as a software module or may interwork with the processor 120 while being included in a separate module.

The bus 110 may be a circuit which interconnects the above-described elements and delivers a communication (e.g., a control message) between the above-described elements.

The processor 120 may receive commands from the above-described other elements (e.g., the memory 130, input/output interface 140, the display module 150, the communication module 160, the fragmentation module 170, etc.) through the bus 110, may interpret the received commands, and may execute calculation or data processing according to the interpreted commands.

The memory 130 may store therein commands or data received from or created at the processor 120 or other elements (e.g., the input/output interface 140, the display 150, the communication interface 160, or fragmentation module 170, etc.). The memory 130 may include programming modules such as a kernel 131, a middleware 132, an application programming interface (API) 133, and an application 134. Each of the programming modules may be composed of software, firmware, hardware, and any combination thereof.

Further, in the present specification, a memory 130 may be a memory having a standard file system of a File Allocation Table (FAT) or an exFAT, a flash memory, a flash memory having a speed class, a NAND flash memory having a speed class, etc. For example, in the present specification, a memory may be an SE card, a micro SD card, etc.

A memory used for fragmentation analysis and a memory in which data (e.g., necessary information, fragmentation ratio information, or an evaluating speed, etc. which are received in a fragmentation-analyzed memory) which may be received during fragmentation analysis may be stored in the same region or may be stored in different regions.

The kernel 131 may control or manage system resources (e.g., the bus 110, the processor 120, or the memory 130, etc.) used for performing operations or functions of the other programming modules, e.g., the middleware 132, the API 133, or the application 134. Additionally, the kernel 131 may offer an interface that allows the middleware 132, the API 133 or the application 134 to access, control or manage individual elements of the electronic device 101

The middleware 132 may perform intermediation by which the API 133 or the application 134 communicates with the kernel 131 to transmit or receive data. Additionally, in connection with task requests received from the applications 134, the middleware 132 may perform a control (e.g., scheduling or load balancing) for the task request by using technique such as assigning the priority for using a system resource of the electronic device 101 (e.g., the bus 110, the processor 120, or the memory 130, etc.) to at least one of the applications 134.

The API 133 which is an interface for allowing the application 134 to control a function provided by the kernel 131 or the middleware 132 may include, for example, at least one interface or function (e.g., a command) for a file control, a window control, an image processing, a text control, and the like.

According to embodiments, the application 134 may include an SMS/MMS application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 134 may be an application associated with an exchange of information between the electronic device 101 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 101 (e.g., the SMS/MMS application, the email application, the health care application, or the environment information application, etc.) to an external electronic device (e.g., the electronic device 104). Additionally or alternatively, the notification relay application may receive notification information from an external electronic device (e.g., the electronic device 104) and offer it to a user. The device management application may manage (e.g., install, remove or update) a certain function (a turn-on/turn-off of an external electronic device (or some components thereof), or an adjustment of brightness (or resolution) of a display) of any external electronic device (e.g., the electronic device 104) communicating with the electronic device 101, a certain application operating at such an external electronic device, or a certain service (e.g., a call service or a message service) offered by such an external electronic device.

According to embodiments, the application 134 may include a specific application specified depending on attributes (e.g., a type) of an external electronic device (e.g., the electronic device 104). For example, in case an external electronic device is an MP3 player, the application 134 may include a specific application associated with a play of music. Similarly, in case an external electronic device is a portable medical device, the application 134 may include a specific application associated with a health care. In an embodiment, the application 134 may include at least one of an application assigned to the electronic device 101 or an application received from an external electronic device (e.g., the server 106 or the electronic device 104).

The input/output interface 140 may transfer a command or data which are input by a user through an input/output device (e.g., a sensor, a keyboard, or a touch screen), to the processor 120, the memory 130, the communication interface 160, or the fragmentation module 170 through, for example, the bus 110. For example, the input/output interface 140 may provide, to the processor 120, data for a user's touch which is input through the touch screen. For example, the input/output interface 140 can output an instruction or data received from the processor 120, the memory 130, the communication interface 160, or the fragmentation module 170 through the bus 110 through the input/output device (e.g., a speaker or a display). For example, the input/output interface 140 may output voice data processed by the processor 120 to the user through a speaker.

The display 150 may display thereon various kinds of information (e.g., multimedia data, text data, etc.) to a user.

The communication interface 160 may perform a communication between the electronic device 101 and any external electronic device (e.g., the electronic device 104 of the server 106). For example, the communication interface 160 may communicate with any external device by being connected with a network 162 through a wired or wireless communication. A wireless communication may include, but not limited to, at least one of WiFi (Wireless Fidelity), BT (Bluetooth), NFC (Near Field Communication), GPS (Global Positioning System), or a cellular communication (e.g., LTE, LTE-A, CDMA, WCDMA, UMTS, WiBro, or GSM, etc.). A wired communication may include, but not limited to, at least one of USB (Universal Serial Bus), HDMI (High Definition Multimedia Interface), RS-232 (Recommended Standard 232), or POTS (Plain Old Telephone Service).

According to an embodiment, the network 162 may be a communication network, which may include at least one of a computer network, an internet, an internet of things, or a telephone network. According to an embodiment, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160.

According to an embodiment, the fragmentation module 170 can analyze fragmentation information of a data region stored in the memory 130, thereby displaying the analyzed fragmentation information to a user or proposing fragmentation analysis (defragmentation).

According to an embodiment, the fragmentation module 170 can receive information on at least one allocation unit of the memory 130 can analyze fragmentation information of the memory 130 on the basis of the at least one received allocation unit. A process of analyzing fragmentation information may be performed through sequentially determining whether data is recorded in at least one record unit constituting at least one allocation unit. The fragmentation module 170 can calculate fragmentation ratio information of the memory 130 on the basis of the analyzed fragmentation information, and when the calculated fragmentation ratio information exceeds a predetermined ratio, an electronic device 101 can propose fragmentation analysis to a user. The fragmentation module 170 can calculate an evaluating speed value of the memory 130 on the basis of the calculated fragmentation ratio information, and the electronic device 101 can display the calculated evaluating speed value through a display 150. The fragmentation module 170 can limit a function of an application program on the basis of the calculated evaluating speed. Additional information is provided to the fragmentation module 170 through FIGS. 2A and 2B which will be described below.

FIG. 2A is a block diagram illustrating the fragmentation module 170 according to an embodiment of the present specification.

The fragmentation module 170 can include an analysis module 180 and an evaluation module 190.

The fragmentation module 170 can analyze fragmentation information on the basis of information on an allocation unit of the memory 130 through the analysis module 180, and can evaluate a fragmentation ratio and an evaluating speed of the memory 130 on the basis of the analyzed information through the evaluation module 190. The fragmentation module 170 can be configured by one or more combinations of firmware, hardware and software. The fragmentation module 170 may be implemented on a processor 120, may be implemented on a circuit module, or may be controlled while being programmed in the memory and called by the processor 120.

FIG. 2B is a block diagram illustrating the fragmentation module 170 in detail according to an embodiment of the present specification.

According to an embodiment, the analysis module 180 may include at least one of a feature analysis unit 181, an arrangement analysis unit 182, and a fragmentation analysis unit 183.

According to an embodiment, the feature analysis unit 181 can receive necessary information of the memory 130 from the memory 130. The memory 130 may be a flash memory (e.g., an SD card, a micro SD card, etc.) having a speed class. For example, the memory 130 may include information of an SD card, such as the entire storage capacity, the size of an allocation unit, a capacity of a data region, a speed class, and the size of a record unit, but the information is not limited thereto. According to an embodiment, the feature analysis unit 181 can analyze and receive information such as the entire storage capacity, the size of an allocation unit, a capacity of a data region, a speed class, and the size of a record unit, among the information of an SD card using the necessary information. The electronic device 101 can store the necessary information received in the feature analysis unit 181 in a separate memory (e.g., an HDD, a RAM, etc.) different from the memory 130 in which whether fragmentation is performed or not is analyzed.

According to an embodiment, when the feature analysis unit 181 does not receive the necessary information from the memory 130, the electronic device 101 can display analysis error information through the display 150 or can stop an operation of the feature analysis unit 181. The fact that the feature analysis unit 181 does not receive the necessary information implies that the necessary information is not valid or the electronic device 101 cannot recognize the memory 130. For example, there is a case where the processor 120 or the feature analysis unit 181 cannot recognize the memory 130 or a case where the memory 130 is not matched with an interface provided by the electronic device 101.

The arrangement analysis unit 182 can transmit, to the electronic device 101, a signal regarding whether fragmentation analysis of the memory 130 can be performed in a state in which the stored data region coincides with a boundary of an allocation unit which is a physical region.

According to an embodiment, the arrangement analysis unit 182 can analyze whether the data region of the memory is arranged by an allocation unit, on the basis of a Master Boot Record (MBR) and a Partition Boot Record (PBR) of the memory 130 collected by the feature analysis unit 181.

The master boot record implies a region in which partition information of the formatted memory 130 when the memory 130 is formatted in a partition. In the present specification, the master boot record may be expressed as the MBR. The partition boot record implies a region which exists at a start address of each of a plurality of partitions when the memory 130 is divided into the plurality of partition regions. In the present specification, the partition boot record may be expressed as the PBR. The partition boot record is different from the master boot record in that the former includes information on a File Allocation Table (FAT) of the memory 130. The FAT is one kind of file table which provides locations of clusters in which a file is stored, in the memory 130.

According to an embodiment, the arrangement analysis unit 182 can receive metadata such as the master boot record, the boot record, and the partition boot record, which are included in the memory 130. The memory 130 may include the MBR or may not include the MBR. When the MBR is included in the memory 130, the arrangement analysis unit 182 can receive information recorded in the MBR to identify a start offset of the PBR. The arrangement analysis unit 182 can identify the start offset of the PBR to identify a location of the PBR. The arrangement analysis unit 182 can receive the master root record recorded in a start address of a first allocation unit of the memory 130. The arrangement analysis unit 182 can receive the partition root record recorded in a start address of a second allocation unit of the memory 130. Addresses of the master boot record and the partition boot record are exemplary, and the present specification is not limited thereto. For example, the addresses corresponding to the master boot record and the partition boot record included in the memory 130 may have various values according to a manufacturer of the memory 130.

The partition boot record may include information on a BIOS variable block, a bootstrap code, a start offset of a data region, or a boot sector. The BIOS variable block is an information table obtained by a user by calling an operating system in a Basic Input/Output System (BIOS). The bootstrap code is one of methods of firstly inputting a program. The start offset of the data region is an initial area in which data is stored. The boot sector is a region first read when a computing system is booted. The offset address is an address of a location apart from a start address by an offset in a computing system. The start offset may imply a start address.

For example, the partition boot record may include the size, data, or related information according to an offset address as represented by the following table. An offset of a data region recorded in the partition boot record and a distance between the master boot record and the partition boot record can be referenced when it is determined whether the data region and the boundary of an allocation unit coincide with each other or not.

TABLE 1

| Offset | Size | Data | Description |
| --- | --- | --- | --- |
| 0x00 | 3 Bytes | 0x00EB 0x90 | Jump instruction |
| 0x03 | 8 Bytes | "MSDOS5.0" | OEM name in text |
| 0x1FE | 2 Bytes | 0x55AA | End of boot sector mark |

Table 1—Example of File Allocation Table of Partition Boot Record>

According to an embodiment, the arrangement analysis unit 182 can identify the start offset of the data region on the basis of a content relating to an offset of the partition boot record as in Table 1.

Although not illustrated in the table, the arrangement analysis unit 182 can receive a start offset address of the data region using a hidden sector count, a reserved sector count, a FAT count, or a FAT size which are included in a partition boot record of a FAT-fs type memory. Further, the arrangement analysis unit 182 can receive the start offset address of the data region using a partition offset and a cluster heap offset which are included in a partition boot record of an exFAT-fs type memory.

According to an embodiment, the arrangement analysis unit 182 can determine whether the calculated start offset of the data region and the boundary of the allocation unit coincide with each other or not, and can transmit the determined information to the electronic device 101. The boundary of the allocation unit, which is a physical boundary by which the memory is divided in a predetermined size, may be a part illustrated in a dotted line in FIG. 3. In the present specification, a physical structure of the memory 130 can be configured by one or more allocation units, and one allocation unit can be configured by one or more recording units. The allocation unit and the recording unit may be a value which is specified during manufacturing and then cannot be changed. In the present specification, the allocation unit may be expressed by "AU", and the recording unit may be expressed by "RU". In the present specification, the boundary of the allocation unit may imply a physical boundary value specified by the allocation unit and the recording unit. In FIG. 3, the boundary of the allocation unit (the size between dotted lines) may be illustrated to be identical to the size of the recording unit. The cluster illustrated in FIG. 3 implies a region having a predetermined size, in which data can be recorded while being divided during file system formatting of the memory 130. The cluster may be a logical space, the size of which can be differently allocated whenever the file system formatting is performed according to a manufacturer or a user's configuration. The cluster may be a unit which can be directly configured by a user, and the recording unit may be a unit specified in advance in consideration of the size, etc. of an SD card, etc. when the SD card, etc. are manufactured. Although the size of the cluster and the size of the recording unit may be identical to each other or may be different from each other, in the present specification, the size of the cluster and the size of the recording unit may be identical to each other. In FIGS. 3A, 3B and 3C, the start offset address of the data region may be differently illustrated. For example, when the file system formatting of the memory 130 is performed, the start addresses of the data region allocated after the meta-data may be differently allocated.

According to an embodiment, when the start offset of the data region and the boundary of the allocation unit coincide with each other, the arrangement analysis unit 182 can designate a start location of the fragmentation analysis as the start offset address of the data region. FIG. 3A illustrates a structure in which a start offset of a data region is sequentially allocated after meta-data such as a FAT. In FIG. 3A, it can be identified that a start offset address of a cluster 0 which is a start offset address of data coincides with a boundary of an allocation unit. The electronic device 101 can determine that the fragmentation analysis is possible, and transmit, to the fragmentation analysis unit 183, a signal instructing execution of the fragmentation analysis on the basis of the start offset address of the data region.

In FIG. 3B, a start offset address of a data region is not sequentially recorded behind an address where meta-data is terminated, but the start offset address of the data region coincides with a boundary (dotted line) of an allocation unit. In other words, a difference between the address where recording of meta-data is terminated and the start offset address of the data region becomes an integer multiple of the size of a cluster. In this case, since data is not stored in a region between the meta-data and the start offset of the data region, the region may be excluded during the fragmentation analysis. Thus, the electronic device 101 can determine that the fragmentation analysis is possible, and transmit, to the fragmentation analysis unit 183, a signal instructing execution of the fragmentation analysis based on the start offset address of the data region.

According to an embodiment, when the arrangement analysis unit 182 identifies that the start offset address of the data region of the memory 130 does not coincides with a boundary of an allocation unit, the electronic device 101 can determine that the fragmentation analysis is impossible. In FIG. 3C, a start offset address of a data region is not sequentially recorded behind an address where meta-data is terminated, and the start offset address of the data region coincides with a boundary (dotted line) of an allocation unit. For example, a difference between the address where recording of metadata is terminated and the start offset address of the data region becomes an integer multiple of the size of a cluster. In this case, since the data region of the memory 130 does not coincide with an allocation unit of the memory, the electronic device 101 cannot perform the fragmentation analysis. Thus, the electronic device 101 can display fragmentation analysis error information on a display 150 or can stop an operation of the arrangement analysis unit 182. When the arrangement analysis unit 182 identifies that the data region and the allocation unit of the memory 130 do not coincide with each other, the electronic device 101 may not transmit a fragmentation analysis execution signal to the fragmentation analysis unit 183.

The fragmentation analysis unit 183 can analyze fragmentation information of each allocation unit on the basis of a location where the fragmentation analysis starts, which is determined by the arrangement analysis unit 182, and a cluster number corresponding thereto. For example, the fragmentation analysis unit 183 can analyze fragmentation information of the memory 130 when receiving a signal instructing execution of the fragmentation analysis, from the electronic device, and can transmit the analyzed fragmentation information to the electronic device 101. The electronic device 101 can store the analyzed fragmentation information in the memory 130. A process of analyzing fragmentation information may be performed by counting the number of clusters being used within each allocation unit from a number of a cluster, which constitutes all allocation units, at a start location to the last cluster, or the number of allocation units which are empty.

According to an embodiment, the fragmentation analysis unit 183 can analyze information on a clean allocation unit within the memory 130 in order to maximally ensure a speed quality performance of the memory 130, and can transmit the analyzed information to the electronic device 101. For example, the fragmentation analysis unit 183 can count only the number of clean allocation units within the memory 130. The clean allocation unit may imply that all clusters constituting one allocation unit are not being used. The clean allocation unit may imply a state in which data is not recorded in all clusters constituting one allocation unit. Since a speed performance of the memory 130 can ensure a writing performance of only a clean allocation unit, the number of clean allocation units may be an indicator important for determining a fragmentation ratio. The electronic device 101 can calculate fragmentation ratio information on the basis of information on the analyzed clean allocation unit. The detailed description relating thereto will be described below with reference to FIGS. 6 and 8.

According to an embodiment, the fragmentation analysis unit 183 can analyze information on whether data is recorded in a recording unit (cluster) constituting at least one allocation unit in order to more minutely analyze fragmentation information of the memory 130. The fragmentation analysis unit 183 can transmit the analyzed information on whether data is recorded in a recording unit (cluster), to the electronic device 101, and the electronic device 101 can transmit the analyzed information on whether data is recorded in a recording unit (cluster) to a fragmentation evaluation unit 192. The fragmentation analysis unit 183 can analyze the information on whether data is recorded in a recording unit or not, by counting the number of clusters being used. The detailed description relating thereto will be described below with reference to FIGS. 7 and 8.

According to an embodiment, an evaluation module 190 may include at least one of an error evaluation unit 191, a fragmentation evaluation unit 192, and a speed evaluation unit 193.

According to an embodiment, the error evaluation unit 191 can identify whether there is an error determined by the analysis module 180. The error determined by the analysis module 180 may be an error determined by the feature analysis unit, the arrangement analysis unit, and the fragmentation analysis unit. For example, an error generated by the feature analysis unit 180 may correspond to a case where necessary information of the memory 130 is not valid or the electronic device 101 can recognize the memory 130. An error generated by the arrangement analysis unit 182 may correspond to a case where a start offset of a data region and the boundary of an allocation unit do not coincide with each other. An error generated by the fragmentation analysis unit 183 may be an error on a system. An error generated by the analysis module 180 may include an error on a system.

According to an embodiment, when the error evaluation unit 191 recognizes error information determined by the feature analysis unit 181 or the fragmentation analysis unit 183, the electronic device 101 can display the error information through the display 150.

According to an embodiment, when the error evaluation unit 191 recognizes error information determined by the arrangement analysis unit 182, the electronic device 101 can display that a format form of the memory 130 is not suitable, through the display 150.

According to an embodiment, when the error evaluation unit 191 recognizes the error information determined by the analysis module 180, the electronic device 101 does not perform an operation of the evaluation module 190.

According to an embodiment, the fragmentation evaluation unit 192 can calculate a fragmentation ratio of the memory 130 on the basis of the fragmentation information of an allocation unit, which is analyzed by the fragmentation analysis unit 183 or the electronic device 101.

According to an embodiment, the fragmentation evaluation unit 192 can calculate a fragmentation ratio of the memory 130 on the basis of the information on whether data is recorded in a recording unit (cluster), which is analyzed by and received from the fragmentation analysis unit 183.

According to an embodiment, the fragmentation evaluation unit 192 can calculate a fragmentation ratio using a ratio of a free space within the memory 130 and a space in which data is stored.

According to an embodiment, the fragmentation evaluation unit 192 can calculate a fragmentation ratio using a ratio of a free space within the memory 130 and a clean allocation unit.

As an embodiment for calculating a fragmentation ratio, the following equation may be used.

MathFigure 1

$$\text{Fragmentation Ratio} = (\text{free space} - (\text{empty allocation unit} \times \text{size of allocation unit})) \div \text{free space} \quad [\text{Math. 1}]$$

The calculated fragmentation ratio may be equal to or larger than 0 and equal to or smaller than 1, and the free space may be the total size of a cluster not used. For example, the free space may be a value obtained by multiplying the total number of clusters not used and the size of one cluster. For example, the free space may be a remaining space within the total storage space, except for a space of a cluster in which data is recorded. According to an embodiment, when the fragmentation ratio calculated by the fragmentation evaluation unit 192 exceeds a predetermined ratio, the electronic device 101 can display the fragmentation information through the display 150 and propose a fragmentation resolving operation (defragmentation) to a user. According to an embodiment, when the fragmentation ratio calculated by the fragmentation evaluation unit 192 exceeds a predetermined ratio, the electronic device 101 can execute a defragmentation application (not illustrated).

The predetermined ratio may be automatically or manually configured according to a user's input or a system' characteristic. The predetermined ratio may be classified into a differential value by a user. The electronic device can execute different functions according to the differential value classified by the fragmentation evaluation unit 192.

For example, the fragmentation ratio calculated by the fragmentation evaluation unit 192 is equal to or larger than a first ratio, the electronic device 101 can display that a defragmentation operation is to be executed, to a user through the display 150. When the fragmentation ratio calculated by the fragmentation evaluation unit 192 is equal to or larger than a second ratio, the electronic device 101 can automatically execute a defragmentation application. The second ratio may be a ratio higher than the first ratio, and the defragmentation application, etc. may be implemented by the electronic device 101 in advance. The speed evaluation unit 193 can calculate an evaluating speed of the memory 130 on the basis of the necessary information of memory 130, which is received by the feature analysis unit 181, the fragmentation ratio calculated by the fragmentation evaluation unit 192, and an evaluating speed threshold value. The evaluating speed threshold value can be manually or automatically determined according to application program characteristics, system characteristics, or a user's input. The evaluating speed threshold value may imply an amount of I/O desired by a user. The evaluating speed threshold value may be a designated value, or may be a value dynamically input according to an application executed by a user or the electronic device 101. An evaluating speed may imply how much an input amount of I/O is satisfied on the basis of the received speed class of the memory 130. The evaluating speed threshold value may be a designated value, or may be a value dynamically input according to an application executed by a user or the electronic device 101.

According to an embodiment, the speed evaluation unit 193 can calculate an evaluating speed using the necessary information of the memory 130, the evaluating speed threshold value, and the fragmentation ratio.

According to an embodiment, the speed evaluation unit 193 can calculate an evaluating speed using the necessary information of the memory 130, the clean allocation unit, and the evaluating speed threshold value.

As an embodiment for calculating a fragmentation ratio, the following equation can be used. As described above, the free space may be the total size of a cluster not used, and a FR may be a calculated fragmentation ratio. The evaluating speed may be equal to or larger than 0 or equal to smaller than the speed class.

MathFigure 2

$$\text{GuaranteeSpeed} = \text{SpeedQuality} \times (\text{FreeSpace} \times (1 - \text{FR})) \div \text{GuaranteeSpeedThoresholdValue} \quad [\text{Math. 2}]$$

here equation, the guarantee speed is equal to or greater than zero and the guarantee speed is smaller than or equal to the speed quality According to an embodiment, the speed evaluation unit 193 can transmit the calculated evaluating speed to the electronic device 101. The electronic device 101 can transmit the received evaluating speed to an application executed on the electronic device 101. The electronic device 101 can restrictively execute an application on the basis of the transmitted evaluating speed or restrictively execute a function of an executed application.

According to an embodiment, when the evaluating speed of the memory 130 exceeds a predetermined speed, the electronic device can further include a restriction module for restraining an application program from being executed or restraining a part of the entirety of a function of an application program.

According to an embodiment, the electronic device 101 can extract an executable application program on the basis of the received evaluating speed. The electronic device 101 can extract an executable function from among functions of an application program on the basis of the received evaluating speed. The electronic device 101 can display, through the display 150, whether an application program can be executed or whether a partial function of an application program can be executed, on the basis of the extracted information.

FIG. 4 is a flowchart illustrating a feature analysis method of an electronic device 101 according to an embodiment of the present specification. According to an embodiment, the electronic device 101 can receive necessary information of the memory 130, in operation 41. The necessary information of the memory 130 may include, for example, the entire size (capacity) of the memory 130, the speed class of the memory 130, information on an AU and a RU which are physical spaces of the memory 130, and other information relating to the memory 130. The necessary information of the memory 130 is exemplary, and the present specification is not limited thereto.

According to an embodiment, the electronic device 101 can determine whether the necessary information received from the memory 130 is valid data, in operation 43. For example, invalid data may imply that the electronic device 101 cannot recognize the memory 130 and thus cannot receive the necessary information. As well, the invalid data may imply the memory 130 is not matched with an interface provided by the electronic device 101.

According to an embodiment, when it is determined that the received necessary information is invalid, the electronic device 101 can display error information, in operation 47. The electronic device 101 can display error information through the display 150. When it is determined that the necessary information is invalid, data arrangement analysis of the memory 130 may not be executed. For example, the electronic device 101 may not transmit a data arrangement analysis execution signal of the memory to the arrangement analysis unit 182.

According to an embodiment, in operation 45, when it is determined that the received necessary information is invalid, the electronic device 101 can configure the received necessary information as specification information of the memory 130. The electronic device 101 can store the received necessary information in the memory 130 or a separate storage region (e.g., a hard disc drive, a Random Access Memory (RAM), etc.), thereby configuring the specification information. The electronic device 101 can transmit the stored necessary information of the memory 101 to the arrangement analysis unit 182, the fragmentation analysis unit 183, the error evaluation unit 191, the fragmentation evaluation unit 192, the speed evaluation unit 193, or other modules of the electronic device 101.

FIG. 5 is a flowchart illustrating an arrangement analysis method of an electronic device 101 according to the present specification.

According to an embodiment, in operation 51, the electronic device 101 can analyze validity of a PBR stored in the memory 130. The PBR can include various pieces of information including a start offset address of a data region. When it is determined that the PBR is invalid, the electronic device 101 may not recognize the PBR of the memory 130. Since the start offset address of the data region cannot be identified when the PBR is invalid, the electronic device 101 cannot specify a start location of fragmentation analysis, thereby making it impossible to perform the fragmentation analysis.

According to an embodiment, in operation 53, the electronic device 101 can determine whether the PBR of the memory 130 is valid or not, and when it is determined that the PBR of the memory 130 is invalid, the electronic device 101 can display error information indicating that the fragmentation analysis is impossible through the display 150, in operation 54. Further, when it is determined that the PBR is invalid, data arrangement analysis of the memory 130 may not be executed. For example, the electronic device 101 can stop data analysis execution of the arrangement analysis unit 182.

According to an embodiment, the electronic device 101 can determine whether the PBR of the memory 130 is valid or not in operation 53, and when it is determined that the PBR is valid, can determine the start offset address of the data region on the basis of PBR information in operation 55. The PBR information may imply description according to a PBR offset as represented by Table 1 as above. Although not represented in Table 1, the description according to a PBR offset may include the start offset address of the data region. The electronic device 101 can the determined start offset address of the data region in the memory 130, etc.

According to an embodiment, in operation 56, the electronic device 101 can determine whether the start offset address of the data region of the memory 130 coincides with the boundary of the allocation unit. When the start offset address does not coincide with the boundary of the allocation unit, in operation 57, the electronic device 101 can display error information indicating that the fragmentation analysis is impossible, through the display 150. When the start offset address coincides with the boundary of the allocation unit, in operation 58, the electronic device 101 can configure the start offset address of the data region as a start location of the fragmentation analysis. For example, the electronic device 101 can transmit, to the fragmentation analysis unit 183, a signal instructing execution of the fragmentation analysis based on the start offset address of the data region.

FIG. 6 is a flowchart illustrating an arrangement analysis method of an electronic device 101 according to the present specification. According to an embodiment, in operation 61, the electronic device 101 can analyze states of an AU and a cluster. For example, when the fragmentation analysis unit 183 receives a fragmentation analysis execution signal from the electronic device 101, the fragmentation analysis unit 183 can sequentially analyze at least one cluster constituting at least one AU on the basis of a start offset of the data region. For example, the fragmentation analysis unit 183 can determine whether data is recorded in a cluster or not, thereby analyzing the cluster. The fragmentation analysis unit 183 can transmit the analyzed material to the electronic device 101.

According to an embodiment, the electronic device 101 can determine whether data exists in the cluster, in operation 62. When operation 62 is firstly performed, the cluster may be a cluster corresponding to the start offset of the data region. When it is determined in operation 62 that data exists in the cluster, the electronic device 101 can branch off to operation 63, and when it is determined in operation 62 that data does not exist in the cluster, the electronic device 101 can branch off to operation 64.

According to an embodiment, the electronic device 101 can count the total number of allocation units, in operation 63. For example, when operation 63 is firstly performed, the total number of allocation units may be counted from 0 to 1.

According to an embodiment, the electronic device 101 can determine whether a cluster currently analyzed is the last cluster of the corresponding allocation unit, in operation 64. When the cluster currently analyzed is the last cluster, the electronic device 101 can count the number of clean allocation units, in operation 65. For example, when operation 65 is firstly performed, the number of clean allocation units may be counted from 0 to 1. When the number of clean allocation units is counted, the total number of allocation units can be counted in operation 63. When the cluster currently analyzed is not the last cluster, the electronic device 101 can determine whether a next cluster to the corresponding allocation unit remains or whether the next allocation unit remains, in operation 66. When the next cluster to the corresponding allocation unit remains or the next allocation unit remains, the electronic device 101 can branch off to operation 68, or else, can terminate the fragmentation analysis.

According to an embodiment, the electronic device 101 can analyze fragmentation by moving to the next cluster of the corresponding allocation unit or the first cluster of the next allocation unit, in operation 67.

According to an embodiment, the electronic device 101 can store information on the number of clean allocation units or the total number of allocation units, which are counted, in the memory 130 or a separate storage region (e.g., a HDD, a RAM, etc.). The electronic device 101 can transmit the stored information on the clean allocation unit or the stored information on the total allocation unit, to the fragmentation evaluation unit 192.

FIG. 7 is a flowchart illustrating yet another fragmentation analysis method of the electronic device 101 according to the present specification.

According to an embodiment, the electronic device 101 can analyze states of an AU and a cluster, in operation 71.

According to an embodiment, the electronic device 101 can determine whether data exists in a cluster, in operation 72. When operation 72 is firstly performed, the cluster may be a cluster corresponding to the start offset of the data region. When it is determined in operation 72 that data exists in the cluster, the electronic device 101 can branch off to operation 73, and when it is determined in operation 72 that data does not exist in the cluster, the electronic device 101 can branch off to operation 74.

According to an embodiment, the electronic device 101 can analyze information on a used cluster, in operation 73. For example, the electronic device 101 can count the number of used clusters. The used cluster implies a state in which data is recorded in a cluster. For example, when operation 73 is firstly performed, the number of used clusters may be counted from 0 to 1.

According to an embodiment, the electronic device 101 can determine whether a cluster currently analyzed is the last cluster of the corresponding allocation unit, in operation 74. When the cluster currently analyzed is the last cluster, the electronic device 101 can count the total number of allocation units and the number of arrangement allocation units, in operation 75. The electronic device 101 can count the number of arrangement allocation units, which implies the number of allocation units having the same used cluster. For example, when fragmentation analysis of all allocation units is terminated, the electronic device 101 can count the number of arrangement allocation units having one used cluster, the number of arrangement allocation units having two used clusters, and the number of arrangement allocation units having n used clusters, on the basis of used clusters. For example, when the total allocation units of the memory 130 is 10 and the numbers of clusters used for allocation units are 1, 1, 1, 1, 2, 2, 2, 3, 3, and 4, respectively, with regard to each arrangement allocation unit, the number of arrangement allocation units corresponding 1 can be counted to be 4, the number of arrangement allocation units corresponding to 2 can be counted to be 3, the number of arrangement allocation units corresponding to 3 can be counted to be 2, and the number of arrangement allocation units corresponding to 4 can be counted to be 1. For example, the arrangement allocation unit corresponding to 1 may imply an arrangement allocation unit having one used cluster. Thus, the number of arrangement allocation units having zero clusters may be equal to the number of clean allocation units.

According to an embodiment, when the cluster currently analyzed is not the last cluster of the corresponding allocation unit, the electronic device 101 can determine whether a next cluster of the corresponding allocation unit remains or the next allocation unit remains in operation 76. When it is determined that the next cluster of the corresponding allocation unit remains or the next allocation unit remains, the electronic device 101 can branch off to operation 77, or else, can terminate the fragmentation analysis.

According to an embodiment, the electronic device 101 can analyze fragmentation information by moving to the next cluster of the corresponding allocation unit or the first cluster of the next allocation unit, in operation 77.

According to an embodiment, the electronic device 101 can store information on a used cluster, the counted total number of allocation units, or the counted number of arrangement allocation units in the memory 130 or a separate storage region (e.g., a HDD, a RAM, etc.) or can transmit the same to the fragmentation evaluation unit 192.

A difference from the fragmentation analysis illustrated in FIG. 6 is that it is determined whether data is recorded in all clusters constituting each allocation unit and the number of allocation units having the same number as the number of clusters in which data is recorded. In the description of FIG. 7, the matters duplicated in FIG. 6 may be omitted.

FIG. 8 is a flowchart illustrating a fragmentation ratio evaluation method of an electronic device according to an embodiment of the present specification. FIG. 8 illustrates a process of calculating a fragmentation ratio on the basis of information obtained through the fragmentation analysis of the memory 130. In the present specification, a fragmentation ratio can be expressed by "FR".

According to an embodiment, the electronic device 101 can determine whether an error determined by the analysis module 180 is detected, in operation 81. The error of the analysis module 180 may be at least one of errors determined by the feature analysis unit 181, the arrangement analysis unit 182, and the fragmentation analysis unit 183. When the analysis module 180 has determined that there is an error, the electronic device 101 can display error information through the display 150, in operation 82. Further, when the analysis module 180 has determined that there is an error, the electronic device 101 may not execute a fragmentation ratio calculation operation.

According to an embodiment, when the analysis module has determined that there is no error, the electronic device 101 can calculate a FR, in operation 83.

According to an embodiment, the electronic device 101 can calculate fragmentation ratio information of the memory on the basis of information on at least one clean allocation unit. Referring to Equation (1), the electronic device 101 can calculate the fragmentation ratio information of the memory 130 using the number of clean allocation units.

According to an embodiment, the electronic device 101 can calculate the fragmentation ratio information on the basis of information on whether data of a recording unit is recorded or not. In Equation (1), the number of clean allocation units may be equal to the number of arrangement allocation units having zero used clusters.

According to an embodiment, the electronic device 101 can determine whether the fragmentation ratio exceeds a predetermined ratio, in operation 84. The predetermined ratio may be automatically or manually configured according to a user or a system' characteristic. The electronic device 101 can branch off to operation 85 when the fragmentation ratio exceeds the predetermined ratio and branch off to operation 86 when the fragmentation ratio does not exceed the predetermined ratio.

According to an embodiment, the electronic device 101 can propose defragmentation through the display 150, in operation 85.

According to an embodiment, the electronic device 101 can differentially classify and configure the predetermined ratio (not illustrated). For example, the fragmentation ratio calculated by the fragmentation evaluation unit 192 is equal to or larger than a first ratio, the electronic device 101 can display that a defragmentation operation is to be executed, to a user through the display 150. When the fragmentation ratio calculated by the fragmentation evaluation unit 192 is equal to or larger than a second ratio, the electronic device 101 can automatically execute a defragmentation application. The second ratio may be a ratio higher than the first ratio, and the defragmentation application, etc. may be implemented by the electronic device 101 in advance.

According to an embodiment, the electronic device 101 can display the calculated fragmentation ratio through the display 150, in operation 86.

According to an embodiment, when the fragmentation evaluation unit 192 calculates fragmentation ratio information on the basis of information on whether data of a recording unit (cluster) is recorded, the electronic device 101 can display information on the calculated ratio, information on the used cluster, or information on the arrangement allocation unit, through the display 150.

FIG. 9 is a flowchart illustrating a method of calculating an evaluating speed of the electronic device 101 according to the present specification. The electronic device 101 can calculate an evaluating speed on the basis of necessary information and fragmentation ratio information of the memory 130. In the present specification, an evaluating speed can be expressed by "ES".

According to an embodiment, the electronic device 101 can determine whether an error determined by the analysis module 180 is detected, in operation 91. The error of the analysis module 180 may be at least one of errors determined by the feature analysis unit 181, the arrangement analysis unit 182, and the fragmentation analysis unit 183. When the analysis module 180 has determined that there is an error, the electronic device 101 can display error information through the display 150, in operation 92. Further, when the analysis module 180 has determined that there is an error, the electronic device 101 may not execute an evaluating speed calculation operation.

According to an embodiment, the electronic device 101 can calculate the evaluating speed on the basis of the necessary information and the fragmentation ratio of the memory 130, in operation 93. An embodiment for evaluating speed calculation is identical to that described in the speed evaluation unit 193.

According to an embodiment, the electronic device 101 can determine whether the evaluating speed exceeds a predetermined speed, in operation 94. The predetermined speed may be automatically or manually configured according to a user or a system' characteristic. The electronic device 101 can branch off to operation 85 when the evaluating speed exceeds the predetermined ratio and branch off to operation 86 when the evaluating speed does not exceed the predetermined ratio.

According to an embodiment, in operation 95, when the evaluating speed does not exceed the predetermined speed, the electronic device 101 can limit execution of an application which may be executed by the electronic device 101 or limit a part or the entirety of functions of the application.

According to an embodiment, the electronic device 101 can display the calculated evaluating speed through the display 150.

FIG. 10 is an exemplary view illustrating a fragmentation analysis method according to an embodiment of the present specification.

According to an embodiment, the electronic device 101 can display at least one information window of the memory 130 on the display 150. The electronic device 101 can display recognized information of the memory 130 on a fragmentation analysis and defragmentation window 1010. For example, the electronic device 101 can display a first memory information window 1011 or a second memory information window 1012 within the fragmentation analysis and defragmentation window 1010. The electronic device 101 can display, on the display 150, information such as a type of a memory relating to the first memory information window 1011 or the second memory information window 1012, the entire capacity, an available space, etc. For example, an extSdCard as one type of the memory may be an external memory 130 recognized by the electronic device 101, and an sdcard may be an internal memory 130 of the electronic device 101. The electronic device 101 can display the necessary information of the memory 130 on the first memory information window 1011 and the second memory information window 1012.

According to an embodiment, the first memory information window 1011 and the second memory information window 1012 can be implemented to be clickable. The electronic device 101 can receive a click signal for at least one of the first memory information window 1011 and the second memory information window 1012. When the click signal is received, the electronic device 101 can select a memory information window corresponding to the received click signal as a target of the fragmentation analysis and defragmentation.

According to an embodiment, the electronic device 101 can display at least one of an analysis window 1013, a fragmentation window 1014, and a predetermined ratio configuration window 1015, on the display 150. The analysis window 1013 can be clickable, and the electronic device 101 can receive a click signal for the analysis window 1013. When the click signal is received, the electronic device 101 can execute fragmentation analysis for the memory 130 currently selected. The defragmentation window 1014 can be clickable, and the electronic device 101 can receive a click signal for the defragmentation window 1014. When the click signal is received, the electronic device 101 can execute defragmentation for the memory 130 currently selected. The predetermined ratio configuration window 1015 can be clickable, and the electronic device 101 can receive a click signal for the predetermined ratio configuration window 1015. When the click signal is received, the electronic device 101 can configure a predetermined ratio for the memory 130 currently selected.

FIGS. 11A to 11E are exemplary views illustrating a fragmentation analysis method according to an embodiment of the present specification.

In FIG. 11A, the electronic device 101 can display a feature analysis error window 1110 on the display 150. For example, the electronic device 101 can display error information which is received from the feature analysis unit 181 through the feature analysis error window 1110, on the display 150. The error information may be a case where the feature analysis unit 181 does not receive the necessary information from the memory 130. The electronic device 101 can display, on the display 150, that the memory 130 cannot be recognized.

According to an embodiment, the electronic device 101 can display at least one of a cancellation window 1111 and a re-try window 1112, on the display 150. The cancellation window 1111 can be clickable, and the electronic device 101 can receive a click signal for the cancellation window 1111.

When the click signal is received, the electronic device 101 can terminate a feature analysis operation. The re-try window 1112 can be clickable, and the electronic device 101 can receive a click signal for the re-try window 1112. When the click signal is received, the electronic device 101 can re-execute a feature analysis operation. Accordingly, a user can insert a new memory 130 into the electronic device 101 or identify a connection state of the memory 130, with reference to the feature analysis error window 1110.

In FIG. 11B, the electronic device 101 can display a fragmentation analysis error window 1120 on the display 150. For example, the electronic device 101 can display error information which is received from the fragmentation analysis unit 182 through the fragmentation analysis error window 1120, on the display 150. The electronic device 101 can display the fragmentation analysis error window 1120 after a click signal for the analysis window 1013 is received in FIG. 10. The error information may be a case where a data region stored in the memory 130 does not coincide with the boundary of an allocation unit. The electronic device 101 can display, on the display 150, that a format is not suitable for fragmentation analysis.

According to an embodiment, the electronic device 101 can display at least one of a cancellation window 1121 and a re-try window 1122, on the display 150. The cancellation window 1121 can be clickable, and the electronic device 101 can receive a click signal for the cancellation window 1121. When the click signal is received, the electronic device 101 can terminate a fragmentation analysis operation. The re-try window 1122 can be clickable, and the electronic device 101 can receive a click signal for the re-try window 1122. When the click signal is received, the electronic device 101 can re-execute a fragmentation analysis operation. Accordingly, a user can format the memory 130 with reference to the fragmentation analysis error window 1120 again.

In FIG. 11C, the electronic device 101 can receive input of predetermined ratio information by displaying a ratio configuration window 1130 on the display 150. For example, the electronic device 101 can display, on the display 150, a UI unit for receiving input of a predetermined ratio through the ratio configuration window 1130. When a click signal for the predetermined ratio configuration window 1015 is received in FIG. 10, the electronic device 101 can display the ratio configuration window 1130 on the display 150.

According to an embodiment, the electronic device 101 can display at least one of a first ratio configuration window 1131 and a second ratio configuration window 1132, on the display 150. The first ratio configuration window 1131 or the second ratio configuration window 1132 can be clicked, dragged, or swapped, and the electronic device 101 can receive a signal for the click, the drag, or the swap of the first ratio configuration window 1131 or the second ratio configuration window 1132, thereby receiving input of fragmentation ratio information. When the fragmentation ratio information is input, the electronic device 101 can perform each predetermined function by comparing the fragmentation ratio calculated by the fragmentation evaluation unit 192 with the input fragmentation ratio information. For example, the fragmentation ratio calculated by the fragmentation evaluation unit 192 is equal to or larger than the input first ratio, the electronic device 101 can display that a defragmentation operation is to be executed, through the display 150. When the fragmentation ratio calculated by the fragmentation evaluation unit 192 is equal to or larger than the input second ratio, the electronic device 101 can automatically execute a defragmentation application.

In FIG. 11D, the electronic device 101 can display a fragmentation analysis completion window 1140 on the display 150. For example, the electronic device 101 can display, on the display 150, the necessary information of the memory 130, which is received from the feature analysis unit 181, the fragmentation ratio calculated by the fragmentation evaluation unit 192, and the evaluating speed calculated by the speed evaluation unit 193. When a click signal for the analysis window 1013 is received in FIG. 10, the electronic device 101 can display the fragmentation analysis completion window 1140 on the display 150.

According to an embodiment, the electronic device 101 can display a defragmentation proposing window 1141 on the display 150. For example, when the fragmentation ratio calculated by the fragmentation evaluation unit 192 is equal to or larger than the input first ratio, the electronic device 101 can display, on the display 150, that the defragmentation is to be executed.

According to an embodiment, the electronic device 101 can display at least one of an identification window 1142 and a cancellation window 1143, on the display 150. The identification window 1142 can be clickable, and the electronic device 101 can receive a click signal for the identification window 1142. When the click signal for the identification window 1142 is received, the electronic device 101 can execute a defragmentation application. The cancellation window 1143 can be clickable, and the electronic device 101 can receive a click signal for the cancellation window 1143. When the click signal for the cancellation window 1143 is received, the electronic device 101 can terminate display of the fragmentation proposing window 1141 and continuously display the fragmentation analysis completion window 1140.

In FIG. 11E, the electronic device 101 can display the fragmentation analysis completion window 1150 on the display 150. For example, the electronic device 101 can display, on the display 150, the necessary information of the memory 130, which is received from the feature analysis unit 181, the fragmentation ratio calculated by the fragmentation evaluation unit 192, and the evaluating speed calculated by the speed evaluation unit 193. When a click signal for the analysis window 1013 is received in FIG. 10, the electronic device 101 can display the fragmentation analysis completion window 1140 on the display 150. A difference from FIG. 11D is that the FR is different.

According to an embodiment, the electronic device 101 can display a defragmentation execution window 1151 on the display 150. For example, when the fragmentation ratio calculated by the fragmentation evaluation unit 192 is equal to or larger than a second ratio, the electronic device 101 can automatically execute a defragmentation application. The electronic device 101 can display, on the display 150, a sign indicating that the defragmentation application is automatically executed.

According to an embodiment, the electronic device 101 can display a termination window 1151 on the display 150. The termination window 1151 can be clickable, and the electronic device 101 can receive a click signal for the termination window 1151. When the click signal for the termination window 1151 is received, the electronic device 101 can cancel the execution of a defragmentation application.

FIG. 12 is an exemplary view illustrating an example of fragmentation according to an embodiment of the present specification.

With regard to the existing fragmentation analysis standard, it is determined that CASE B is more fragmented than CASE A. This is because CASE B does not satisfy continuity more as compared with CASE A.

In contrast, with regard to a fragmentation analysis standard of the present specification, it is determined that CASE B is less fragmented than CASE A. This is because, in a state in which the same free space is provided, CASE A has the number of one clean allocation unit, but CASE B has the number of three clean allocation units. In a case of CASE C, there is no difference between the existing fragmentation analysis and the fragmentation analysis of the present specification.

When it is assumed that the size of one illustrated allocation unit is 1 MB, if the FR of CASE A is examined on the basis of the above equation, FR=2.25/3.25=about 69%. With regard to the FR of CASE B, FR=0.25/3.25=about 7.6%. Thus, CASE B has a higher probability to ensure the writing performance equal to the speed quality as compared with CASE A.

FIG. 13 is a block diagram illustrating a configuration of hardware according to an embodiment of the present disclosure.

Referring to FIG. 13, hardware 1300 may be, for example, the electronic device 100 illustrated in FIG. 1. As illustrated in FIG. 13, the hardware 1300 may include one or more application processors (AP) 1310, a Subscriber Identification Module (SIM) card 1324, a communication module 1320, a memory 1330, a sensor module 1340, an input module 1350, a display module 1360, an interface 1370, an audio module (e.g., audio coder/decoder (codec)) 1380, a camera module 1391, a power management module 1395, a battery 1396, an indicator 1397, a motor 1398 and any other similar and/or suitable components.

The AP 1310 (e.g., the processor) may include one or more Application Processors (APs), or one or more Communication Processors (CPs).

The AP 1310 may execute an Operating System (OS) or an application program, and thereby may control multiple hardware or software elements connected to the AP 1310 and may perform processing and arithmetic operations on various data including multimedia data. The AP 1310 may be implemented by, for example, a System on Chip (SoC). According to various embodiments of the present disclosure, the AP 1310 may further include a Graphical Processing Unit (GPU) (not illustrated).

The SIM card 1324 may be a card implementing a subscriber identification module, and may be inserted into a slot formed in a particular portion of the electronic device 100. The SIM card 1324 may include unique identification information (e.g., Integrated Circuit Card IDentifier (ICCID)) or subscriber information (e.g., International Mobile Subscriber Identity (IMSI)).

The communication module 1320 may be, for example, the communication module 160 illustrated in FIG. 1. The communication module 1320 may include a Radio Frequency (RF) module 1329. The communication module 1320 may further include, for example, a cellular module 1321, a Wi-Fi module 1323, a Bluetooth (BT) module 1325, a GPS module 1327, a Near Field Communications (NFC) module 1328. For example, the communication module 1320 may provide a wireless communication function by using a radio frequency. Additionally or alternatively, the communication module 1320 may include a network interface (e.g., a Local Area Network (LAN) card), a modulator/demodulator (modem), and/or the like for connecting the hardware 1300 to a network (e.g., the Internet, a LAN, a Wide Area Network (WAN), a telecommunication network, a cellular network, a satellite network, a Plain Old Telephone Service (POTS), and/or the like).

The cellular module 1321 may further include a Communication Processor (CP). The CP may control the transmission and reception of data by the communication module 1320. As illustrated in FIG. 13, the elements such as the CP, the power management module 1395, the memory 1330, and the like are illustrated as elements separate from the AP 1310. However, according to various embodiments of the present disclosure, the AP 1310 may include at least some (e.g., the CP) of the above-described elements. The CP may manage a data line and may convert a communication protocol in the case of communication between the electronic device (e.g., the electronic device 100) including the hardware 200 and different electronic devices connected to the electronic device through the network.

The RF module 1329 may be used for transmission and reception of data, for example, transmission and reception of RF signals or called electronic signals. Although not illustrated, the RF unit 1329 may include, for example, a transceiver, a Power Amplifier Module (PAM), a frequency filter, a Low Noise Amplifier (LNA), and/or the like.

In addition, the RF module 1329 may further include a component for transmitting and receiving electromagnetic waves in a free space in a wireless communication, for example, a conductor, a conductive wire, or the like.

The memory 1330 may include an internal memory 1332 and an external memory 1334. The memory 1330 may be, for example, the memory 130 illustrated in FIG. 1. According to various embodiments of the present disclosure, internal memory 1332 may include, for example, at least one of a volatile memory (e.g., a Dynamic Random Access Memory (DRAM), a Static RAM (SRAM), a Synchronous Dynamic RAM (SDRAM), and/or the like), and a non-volatile memory (e.g., a One Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, and/or the like). According to various embodiments of the present disclosure, the internal memory 1332 may be in the form of a Solid State Drive (SSD). The external memory 1334 may further include a flash drive, for example, a Compact Flash (CF), a Secure Digital (SD), a Micro-Secure Digital (Micro-SD), a Mini-Secure Digital (Mini-SD), an extreme Digital (xD), a memory stick, and/or the like.

The sensor module 1340 may include, for example, at least one of a gesture sensor 1340A, a gyro sensor 1340B, an atmospheric pressure sensor 1340C, a magnetic sensor 1340D, an acceleration sensor 1340E, a grip sensor 1340F, a proximity sensor 1340G, a Red, Green and Blue (RGB) sensor 1340H, a biometric sensor 1340I, a temperature/humidity sensor 1340J, an illuminance sensor 1340K, and a Ultra Violet (UV) sensor 1340M. The sensor module 1340 may measure a physical quantity and/or may detect an operating state of the electronic device 100, and may convert the measured or detected information to an electrical signal. Additionally/alternatively, the sensor module 1340 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and/or the like. Additionally or alternatively, the sensor module 1340 may include, for example, an E-nose sensor (not illustrated), an EMG sensor (not illustrated), an EEG sensor (not illustrated), an ECG sensor (not illustrated), a fingerprint sensor, and/or the like. The sensor module 1340 may further include a control circuit (not illustrated) for controlling one or more sensors included therein.

The input module 1350 may include a touch panel 1352, a pen sensor 1354 (e.g., a digital pen sensor), keys 1356, and an ultrasonic input unit 1358. The input module 1350 may be, for example, the user input module 140 illustrated in FIG. 1. The touch panel 1352 may recognize a touch input in at least one of, for example, a capacitive scheme, a resistive scheme, an infrared scheme, an acoustic wave scheme, and the like. In addition, the touch panel 1352 may further include a controller (not illustrated). In the capacitive type, the touch panel 1352 is capable of recognizing proximity as well as a direct touch. The touch panel 1352 may further include a tactile layer (not illustrated). In this event, the touch panel 1352 may provide a tactile response to the user.

The pen sensor 1354 (e.g., a digital pen sensor), for example, may be implemented by using a method identical or similar to a method of receiving a touch input from the user, or by using a separate sheet for recognition. For example, a key pad or a touch key may be used as the keys 1356.

The ultrasonic input unit 1358 enables the terminal to detect a sound wave by using a microphone (e.g., a microphone 1388) of the terminal through a pen generating an ultrasonic signal, and to identify data. The ultrasonic input unit 1358 is capable of wireless recognition. According to various embodiments of the present disclosure, the hardware 1300 may receive a user input from an external device (e.g., a network, a computer, a server, and/or the like), which is connected to the communication module 1330, through the communication module 1330.

The display module 1360 may include a panel 1362, a hologram 1364, a projector 1366, and/or the like. The display module 1360 may be, for example, the display module 150 illustrated in FIG. 1. The panel 1362 may be, for example, a Liquid Crystal Display (LCD) and an Active Matrix Organic Light Emitting Diode (AM-OLED) display, and/or the like. The panel 1362 may be implemented so as to be, for example, flexible, transparent, or wearable. The panel 1362 may include the touch panel 1352 and one module. The hologram 1364 may display a three-dimensional image in the air by using interference of light. According to various embodiments of the present disclosure, the display module 1360 may further include a control circuit for controlling the panel 1362 or the hologram 1364.

The interface module 1370 may include an High-Definition Multimedia Interface (HDMI) module 1372, a Universal Serial Bus (USB) module 1374, an optical interface module 1376, a D-subminiature (D-SUB) module 1378, and/or the like. Additionally or alternatively, the interface 1370 may include, for example, one or more interfaces for Secure Digital (SD)/MultiMedia Card (MMC) (not shown) or Infrared Data Asociation (IrDA) (not shown). The interface module 1370 or any of its sub-modules may be configured to interface with another electronic device (e.g., an external electronic device), an input device, an external storage device, and/or the like.

The audio module 1380 may encode/decode voice into electrical signal, and vice versa. The audio module 1380 may, for example, encode/decode voice information that are input into, or output from, a speaker 1382, a receiver 1384, an earphone 1386, and/or a microphone 1388.

The camera module 1391 may capture still images or video. According to various embodiments of the present disclosure, the camera module 1391 may include one or more image sensors (e.g., front sensor module or rear sensor module; not shown), an Image Signal Processor (ISP, not shown), or a flash Light-Emitting Diode (flash LED, not shown).

The power management module 1395 may manage electrical power of the hardware 1300. Although not shown, the power management module 1395 may include, for example, a Power Management Integrated Circuit (PMIC), a charger Integrated Circuit (charger IC), a battery fuel gauge, and/or the like.

The PMIC, for example, may be disposed in an integrated circuit or an SoC semiconductor. The charging method for the hardware 1300 may include wired or wireless charging. The charger IC may charge a battery, or prevent excessive voltage or excessive current from a charger from entering the hardware 1300. According to various embodiments of the present disclosure, the charger IC may include at least one of a wired charger IC or a wireless charger IC. The wireless charger IC may be, for example, a magnetic resonance type, a magnetic induction type or an electromagnetic wave type, and may include circuits such as, for example, a coil loop, a resonance circuit or a rectifier.

The battery gauge may measure, for example, a charge level, a voltage while charging, a temperature of battery 1396, and/or the like. The battery 1396 may supply power to, for example, the hardware 1300. The battery 1396 may be, for example, a rechargeable battery.

The indicator 1397 may indicate one or more states (e.g., boot status, message status or charge status) of the hardware 1300 or a portion thereof (e.g., the AP 1311). The motor 1398 may convert electrical signal into mechanical vibration. MCU 1399 may control the sensor module 1340.

Although not illustrated, the hardware 1300 may include a processing unit (e.g., a Graphics Processing Unit (GPU)) for supporting a module TV. The processing unit for supporting a module TV may process media data according to standards such as, for example, Digital Multimedia Broadcasting (DMB), Digital Video Broadcasting (DVB), media flow, and/or the like.

According to various embodiments of the present disclosure, each of the above-described elements of the hardware 1300 may include one or more components, and the name of the relevant element may change depending on the type of electronic device. According to various embodiments of the present disclosure, the hardware 1300 may include at least one of the above-described elements. Some of the above-described elements may be omitted from the hardware 1300, or the hardware 1300 may further include additional elements. In addition, according to various embodiments of the present disclosure, some of the elements of the hardware 1300 may be combined into one entity, which may perform functions identical to those of the relevant elements before the combination.

FIG. 14 illustrates a communication protocol between a plurality of electronic devices according to various embodiments of the present disclosure. For example, FIG. 14 illustrates a communication protocol 1410 between an electronic device 1410 and an electronic device 1430 according to various embodiments of the present disclosure.

Referring to FIG. 14, the communication protocol 1400 may include a device discovery protocol 1451, a capability exchange protocol 1453, a network protocol 1455, and an application protocol 1457.

The device discovery protocol 1451 may be a protocol that allows the electronic devices (e.g., the electronic device 1410 or the electronic device 1430) to detect an external electronic device which can be connected thereto through short-range communication or connects the found external electronic device thereto. For example, the electronic device 1410 (e.g., the electronic device 100) may detect the electronic device 1430 (e.g., the electronic device 104) as a device, which can communicate with the electronic device 1410, through a short-range communication method (e.g., Bluetooth and/or the like) using the device discovery protocol 1451. The electronic device 1410 may acquire and store identification information of the electronic device 1430 detected through the device discovery protocol 1451 for a communication connection with the electronic device 1430. For example, the electronic device 1410 may establish the communication connection with the electronic device 1430 at least based on the identification information. The device discovery protocol 1451 may be a protocol for authenticating a plurality of electronic devices. For example, the electronic device 1410 may perform an authentication between the electronic device 1410 and the electronic device 1430 based on communication information (e.g., a Media Access Control (MAC) address, a Universally Unique IDentifier (UUID), a SubSystem IDentification (SSID), and an Information Provider (IP) address) for the connection with the electronic device 1430.

The capability exchange protocol 1453 may be a protocol for exchanging information related to a service function which can be supported by at least one of the electronic device 1410 and the electronic device 1430. For example, the electronic device 1410 and the electronic device 1430 may exchange information related to a service function currently provided by each of the electronic device 1410 and the electronic device 1430 through the capability exchange protocol 1453. The information which can be exchanged between the electronic devices may include identification information indicating a particular service among a plurality of services which can be supported by the electronic device 1410 and the electronic device 1430. For example, the electronic device 1410 may receive, from the electronic device 1430, identification information of a particular service provided by the electronic device 1430 through the capability exchange protocol 1453. In this case, the electronic device 1410 may determine whether the electronic device 1410 can support the particular service based on the received identification information.

The network protocol 1455 may be a protocol for controlling flows of data which is transmitted/received to provide a service linked between the electronic devices (e.g., the electronic device 1410 and the electronic device 1430) which are connected to communicate with each other. For example, at least one of the electronic device 1410 and the electronic device 1430 may control an error or data quality by using the network protocol 1455. Additionally or alternatively, the network protocol 1455 may determine a transport format of data transmitted/received between the electronic device 1410 and the electronic device 1430. Further, at least one of the electronic device 1410 and the electronic device 1430 may at least manage a session (e.g., connect or terminate a session) for a data exchange between the electronic devices by using the network protocol 1455.

The application protocol 1457 may be a protocol for providing a process or information for exchanging data related to a service provided to an external electronic device. For example, the electronic device 1410 (e.g., the electronic device 100) may provide a service to the electronic device 1430 (e.g., the electronic device 104 or the server 106) through the application protocol 1457.

The communication protocol 1400 may include a standard communication protocol, a communication protocol designated by an individual or organization (e.g., a communication protocol self-designated by a communication device manufacturing company or a network supplying company) or a combination thereof.

According to various embodiments, provided is a storage medium in which commands are stored, wherein the commands are configured to operate at least one operation by at least one processor when being executed by the at least one processor, and the least one operation includes: receiving information on at least one allocation unit of a memory; and calculating fragmentation ratio information of the memory on the basis of the received information on the at least one allocation unit.

The term "module" used in embodiments of the present disclosure may refer to, for example, a "unit" including one of hardware, software, and firmware, or a combination of two or more thereof. The term "module" may be interchangeable with a term such as a unit, a logic, a logical block, a component, or a circuit. The "module" may be a minimum unit of an integrated component or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the present disclosure, at least some of the devices (e.g., modules or functions thereof) or the method (e.g., operations) according to the present disclosure may be implemented by a command stored in a non-transitory computer-readable storage medium in a programming module form. When the command is executed by one or more processors (e.g., the processor), the one or more processors may execute a function corresponding to the command. The non-transitory computer-readable storage medium may be, for example, the memory 130. At least a part of the programming module may be implemented (e.g., executed) by, for example, the processor 210. At least a part of the programming module may include, for example, a module, a program, a routine, a set of instructions, and/or a process for performing one or more functions.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (e.g., programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of analyzing fragmentation of an electronic device, the method comprising:
receiving information on at least one allocation unit of a memory;
calculating fragmentation ratio information of the memory based on the received information on the at least one allocation unit;
receiving necessary information including an entire capacity of the memory and a speed class of the memory;
receiving an evaluating speed threshold value according to an application program characteristic, a system characteristic, or a user's input; and
calculating an evaluating speed of the memory based on the necessary information and the calculated fragmentation ratio information.

2. The method of claim 1, wherein the at least one allocation unit comprises at least one recording unit, and
wherein calculating the fragmentation ratio information comprises:
receiving information on a clean allocation unit in which data is not recorded in all recording units constituting the at least one allocation unit; and
calculating the fragmentation ratio information further based on the received information on the clean allocation unit.

3. The method of claim 1, wherein the at least one allocation unit comprises at least one recording unit, and
wherein calculating the fragmentation ratio information comprises:
receiving information on whether data is recorded in a recording unit constituting the at least one allocation unit; and
calculating the fragmentation ratio information further based on the received information on whether data is recorded in the recording unit.

4. The method of claim 1, further comprising:
displaying a user interface proposing defragmentation if the calculated fragmentation ratio exceeds a predetermined ratio.

5. The method of claim 1, further comprising:
limiting an application program or limiting at least a part of functions of the application program if the calculated evaluating speed of the memory exceeds the received evaluating speed threshold value.

6. A method of analyzing fragmentation of an electronic device, comprising:
receiving information on at least one allocation unit of a memory;
receiving a partition boot record information;
identifying a start offset of a data region of the memory based on the received partition boot record information;
determining whether the identified start offset of the data region of the memory coincides with a boundary of the at least one allocation unit; and
if the identified start offset coincides with the boundary of the at least one allocation unit, calculating fragmentation ratio information based on the received information on the at least one allocation unit and the identified start offset of the data region of the memory.

7. The method of claim 6, further comprising:
if the identified start offset of the data region of the memory does not coincide with the boundary of the received at least one allocation unit, displaying a fragmentation analysis error.

8. An electronic device comprising:
a processor configured to:
receive information on at least one allocation unit of a memory,
analyze fragmentation information of the memory based on the received information on the at least one allocation unit,
calculate fragmentation ratio information of the memory based on the analyzed fragmentation information,
receive necessary information including an entire capacity of the memory and a speed class of the memory and an evaluating speed threshold value according to an application program characteristic, a system characteristic, or a user's input, and
calculating an evaluating speed of the memory based on the necessary information and the calculated fragmentation ratio information.

9. The electronic device of claim 8, wherein the processor is further configured to:
analyze information on a clean allocation unit in which data is not recorded in all recording units constituting the at least one allocation unit, and
wherein calculating the fragmentation ratio information is further based on the analyzed information on the clean allocation unit.

10. The electronic device of claim 8, wherein the at least one allocation unit comprises at least one recording unit,
wherein the processor is further configured to analyze information on whether data is recorded in a recording unit constituting the at least one allocation unit, and
wherein calculating the fragmentation ratio information is further based on the analyzed information on whether data is recorded in a recording unit.

11. The electronic device of claim 8, further comprising:
a display,
wherein the processor is further configured to control the display to display a user interface proposing defragmentation if the calculated fragmentation ratio exceeds a predetermined ratio.

12. The electronic device of claim 8, wherein the processor is further configured to:
limit an application program or limit at least a part of functions of the application program if the evaluating speed of the memory exceeds the received evaluating speed threshold value.

13. An electronic device comprising:
a processor configured to:
receive information on at least one allocation unit of a memory;
receive a partition boot record information;
identify a start offset of a data region of the memory based on the received partition boot record information;
determine whether the identified start offset of the data region of the memory coincides with a boundary of the at least one allocation unit; and
if the identified start offset coincides with the boundary of the at least one allocation unit, calculate fragmentation ratio information of the memory based on the received information on the at least one allocation unit and the identified start offset of the data region of the memory.

14. The electronic device of claim 13, wherein the processor is further configured to:

if the identified start offset of the data region of the memory does not coincide with the boundary of the at least one allocation unit, display a fragmentation analysis error.

* * * * *